US011482764B2

(12) United States Patent
Suzuki et al.

(10) Patent No.: US 11,482,764 B2
(45) Date of Patent: Oct. 25, 2022

(54) TECHNIQUE OF DETERMINING FIRST, SECOND, AND THIRD POTENTIALS AT COMMUNICATION TERMINAL OF BATTERY PACK

(71) Applicant: MAKITA CORPORATION, Anjo (JP)

(72) Inventors: Hitoshi Suzuki, Anjo (JP); Minoru Gyoda, Anjo (JP); Nobuyuki Oyama, Anjo (JP); Hiroshi Inoue, Anjo (JP)

(73) Assignee: MAKITA CORPORATION, Anjo (JP)

( * ) Notice: Subject to any disclaimer, the term of this patent is extended or adjusted under 35 U.S.C. 154(b) by 493 days.

(21) Appl. No.: 16/587,464

(22) Filed: Sep. 30, 2019

(65) Prior Publication Data

US 2020/0106081 A1    Apr. 2, 2020

(30) Foreign Application Priority Data

Oct. 1, 2018  (JP) .............................. JP2018-186576
Jan. 8, 2019  (JP) .............................. JP2019-001242

(51) Int. Cl.
*H01M 10/46*   (2006.01)
*H01M 50/572*  (2021.01)
(Continued)

(52) U.S. Cl.
CPC ......... *H01M 50/572* (2021.01); *H01M 10/44* (2013.01); *H01M 50/20* (2021.01);
(Continued)

(58) Field of Classification Search
CPC ...... H02J 7/0063; H02J 7/0068; H02J 7/0044; H02J 7/00036; H02J 7/0036;
(Continued)

(56) References Cited

U.S. PATENT DOCUMENTS

2012/0037385 A1   2/2012  Suzuki et al.
2013/0335013 A1  12/2013  Suzuki et al.
(Continued)

FOREIGN PATENT DOCUMENTS

EP    1598914 A1    11/2005
JP    2010-158743 A  7/2010
(Continued)

OTHER PUBLICATIONS

Apr. 14, 2020 Extended European Search Report issued in European Patent Application No. 19200397.8.
Aug. 2, 2022 Office Action issued in Japanese Patent Application No. 2019-001242.

*Primary Examiner* — Edward Tso

(74) *Attorney, Agent, or Firm* — Oliff PLC

(57) ABSTRACT

A battery pack in one aspect of the present disclosure includes a communication terminal and a detector, and supplies electric power to an external device. The communication terminal receives a first signal, a second signal, and a third signal. The first signal has a first potential, the second signal has a second potential, and the third signal has a third potential. The first potential, the second potential, and the third potential are different from one another. The detector determines a potential at the communication terminal, to thereby detect the first signal, the second signal, or the third signal in accordance with the determined potential.

12 Claims, 12 Drawing Sheets

(51) Int. Cl.
*H01M 10/44* (2006.01)
*H02J 7/00* (2006.01)
*H01M 50/20* (2021.01)

(52) U.S. Cl.
CPC .......... *H02J 7/0044* (2013.01); *H02J 7/0063* (2013.01); *H02J 7/0068* (2013.01); *H02J 2007/0067* (2013.01)

(58) Field of Classification Search
CPC ........... H02J 2007/0067; H01M 10/44; H01M 10/46; H01M 2010/4271; H01M 2010/4278; H01M 50/20; H01M 50/572
USPC ....... 320/107, 114, 115, 127, 135, 152, 157, 320/162, 164, 112
See application file for complete search history.

(56) References Cited

U.S. PATENT DOCUMENTS

| | | |
|---|---|---|
| 2014/0292245 A1 | 10/2014 | Suzuki et al. |
| 2015/0185289 A1 | 7/2015 | Yang et al. |
| 2018/0277801 A1* | 9/2018 | Brozek ................. H01M 50/55 |

FOREIGN PATENT DOCUMENTS

| | | |
|---|---|---|
| JP | 2011-188586 A | 9/2011 |
| JP | 2012-183611 A | 9/2012 |
| JP | 5270380 B2 | 8/2013 |
| JP | 2014-188662 A | 10/2014 |
| WO | 2016/031073 A1 | 3/2016 |

* cited by examiner

| STATE OF INPUT | | | STATE OF OUTPUT | | | | | | | |
|---|---|---|---|---|---|---|---|---|---|---|
| COUPLING OF DEVICE | STATE OF BATTERY | STATE OF TRIGGER SW | $V_{DT}$ | Q1 | Q6 | Q7 | Q8 | STATE OF DEVICE | DETECTION OF COUPLING OF DEVICE | TRIGGER SW DETECTION |
| UNCOUPLED | SHUT-DOWN | — | Open | OFF | — | — | — | SHUT-DOWN | — | — |
| UNCOUPLED | IN OPERATION | — | $V_{bat}$ | ON | — | — | — | SHUT-DOWN | H | H |
| COUPLED | SHUT-DOWN | — | GROUND | OFF | OFF | OFF | OFF | SHUT-DOWN | — | — |
| COUPLED | IN OPERATION | OFF | ≈Vd1 | ON | ON | ON | OFF | IN OPERATION | L | H |
| COUPLED | IN OPERATION | ON | ≈0 | ON | ON | ON | ON | IN OPERATION | L | L |

⇒ WITHOUT EXTERNAL DEVICE

⇒ WITH EXTERNAL DEVICE, TRIGGER SW-OFF

⇒ WITH EXTERNAL DEVICE, TRIGGER SW-ON

FIG. 6

| STATE OF INPUT | | | STATE OF ELEMENTS | | | | | | | | | | STATE OF OUTPUT | | | |
|---|---|---|---|---|---|---|---|---|---|---|---|---|---|---|---|---|
| COUPLING OF DEVICE | STATE OF BATTERY | STATE OF TRIGGER SW | $V_{DT}$ | Q1 | Q2 | Q3 | Q4 | Q5 | Q6 | Q7 | Q8 | STATE OF DEVICE | DETECTION OF COUPLING OF DEVICE | TRIGGER SW DETECTION | |
| UNCOUPLED | SHUT-DOWN | – | Open | OFF | OFF | OFF | OFF | OFF | – | – | – | SHUT-DOWN | – | – | |
| UNCOUPLED | IN OPERATION | – | $V_{bat}$ | ON | OFF | OFF | OFF | OFF | – | – | – | SHUT-DOWN | H | H | ⇒ WITHOUT EXTERNAL DEVICE |
| COUPLED | SHUT-DOWN | – | GROUND | OFF | OFF | OFF | OFF | OFF | OFF | OFF | OFF | SHUT-DOWN | – | – | ⇒ WITH EXTERNAL DEVICE |
| COUPLED | IN OPERATION | OFF | ≈$V_{bat}$−$V_{d11}$ | ON | ON | ON | OFF | OFF | ON | ON | OFF | IN OPERATION | L | H | ⇒ WITH EXTERNAL DEVICE, TRIGGER SW-OFF |
| COUPLED | IN OPERATION | ON | ≈$V_{d1}$ | ON | ON | ON | ON | ON | ON | ON | ON | IN OPERATION | L | L | ⇒ WITH EXTERNAL DEVICE, TRIGGER SW-ON |

FIG. 10

TECHNIQUE OF DETERMINING FIRST, SECOND, AND THIRD POTENTIALS AT COMMUNICATION TERMINAL OF BATTERY PACK

CROSS-REFERENCE TO RELATED APPLICATIONS

The present application claims the benefit of Japanese Patent Application No. 2018-186576 filed on Oct. 1, 2018 with the Japan Patent Office and Japanese Patent Application No. 2019-001242 filed on Jan. 8, 2019 with the Japan Patent Office, the entire disclosures of which are incorporated herein by reference.

BACKGROUND

The present disclosure relates to a technique of detecting coupling of an external device to a battery pack.

An electric power tool disclosed in Japanese Patent No. 5270380 includes an electric power tool body and a battery pack. The electric power tool body includes a trigger switch and a body-side terminal. The battery pack includes a battery-side terminal to be connected to the body-side terminal, and obtains a signal indicating whether the trigger switch is ON or OFF through the battery-side terminal. Upon detection of a signal indicating that the trigger switch is ON, the battery pack recognizes that the electric power tool body is coupled to the battery pack.

SUMMARY

The aforementioned battery pack cannot detect that the electric power tool body is coupled to the battery pack until the trigger switch is turned ON. It is preferable, however, that the battery pack be configured to recognize upon coupling that the electric power tool body is coupled, thereby preparing for subsequent discharge or charge. For this purpose, it is preferable that a greater number of signals can be outputted from the electric power tool body to the battery pack.

However, increase in the number of terminals to couple the battery pack to electric power tool body to allow output of a greater number of signals from the electric power tool body to the battery pack will cause size increase of a circuit board included in the battery pack, and thus size increase of the battery pack. Similarly, there will be caused size increase of a circuit board included in the electric power tool body, and thus size increase of the electric power tool body. It is, therefore, preferable that a greater number of signals can be outputted from the electric power tool body to the battery pack without increasing the number of terminals.

In one aspect of the present disclosure, it is preferable that a battery pack can detect a greater number of signals related to an external device while reducing the number of terminals.

One aspect of the present disclosure is a battery pack that includes a communication terminal and/or a detector, and supplies electric power to an external device. The external device includes an operation device configured to operate by receiving electric power, and/or a switch configured to instruct operation and stop of the operation device. The communication terminal is configured to receive a first signal, a second signal, and a third signal. The first signal has a first potential, the second signal has a second potential, and the third signal has a third potential. The first potential, the second potential, and the third potential are different from one another. The detector is configured to determine a potential at the communication terminal, to thereby detect the first signal, the second signal, or the third signal in accordance with the determined potential.

As mentioned above, the battery pack includes the communication terminal that receives the first signal indicating uncoupling of the external device, the second signal indicating ON of the switch, and the third signal indicating OFF of the switch. The first signal has the first potential, the second signal has the second potential, and the third signal has the third potential, and the first potential, the second potential, and the third potential are different from one another. Accordingly, the battery pack can detect the first signal, the second signal, or the third signal by determining the potential generated at the communication terminal. That is, the battery pack can detect a greater number of signals related to the external device without increasing the number of terminals.

The battery pack may also include a shut-down outputter. The shut-down outputter generates, at the communication terminal, a fourth potential, to thereby output a fourth signal to the external device through the communication terminal, the fourth signal indicating that the battery pack is in a shut-down state. The fourth potential is different from the first potential, the second potential, or the third potential.

The battery pack can output the fourth signal to the external device by generating, at the communication terminal, the fourth potential that is different from the first potential, the second potential, or the third potential. That is, through the communication terminal, the battery pack can detect the first signal, the second signal, and the third signal, and also can output the fourth signal to the external device.

The battery pack may also include a potential generator. The potential generator may be configured to generate, at the communication terminal, the first potential based on a positive electrode potential of the battery pack in response to uncoupling of the external device. The potential generator may be configured to generate, at the communication terminal, the second potential based on a positive electrode potential of the battery pack in response to ON of the switch. The potential generator may be configured to generate, at the communication terminal, the third potential based on a positive electrode potential of the battery pack in response to OFF of the switch.

The potential is generated at the communication terminal based on the positive electrode potential of the battery pack by the potential generator, in accordance with uncoupling of the external device, ON of the switch, or OFF of the switch. That is, upon receiving the first signal, the second signal, or the third signal from the communication terminal, a relatively high potential is generated at the communication terminal. Thus, the first signal, the second signal, or the third signal can be easily distinguished from the other signals, and is less likely to be misdetected.

The battery pack may also include a constant current device configured to maintain a constant current consumption of the detector.

The battery pack including the constant current device can maintain the constant current consumption of the detector, regardless of a voltage of the battery pack. That is, in a case of a relatively high voltage of the battery pack, the current consumption of the detector will not increase as compared with a case of a relatively low voltage of the battery pack. Accordingly, a reduced current consumption of the detector can be achieved.

The battery pack may also include a control circuit configured to wake up in response to a change of the determined potential from the first potential to the third potential.

Upon coupling of the external device to the battery pack, the control circuit of the battery pack wakes up. This enables the control circuit to determine whether the battery pack is in a dischargeable state and prepare for discharge, prior to turning ON of the switch of the external device. Thus, a user can use the external device immediately after turning ON the switch of the external device.

Another aspect of the present disclosure is a battery system that includes an external device and a battery pack. The battery pack supplies electric power to the external device. The external device includes an operation device, and/or a switch, and/or a device-side communication terminal to communicate with the battery pack. The operation device is configured to operate by receiving electric power. The switch is configured to instruct operation and stop of the operation device. The battery pack includes a communication terminal and/or a detector. The communication terminal is configured to be coupled to the device-side communication terminal and to receive a first signal, a second signal, and a third signal. The first signal has a first potential, the second signal has a second potential, and the third signal has a third potential, and the first potential, the second potential, and the third potential are different from one another. The first signal indicates uncoupling of the external device. The second signal indicates ON of the switch. The third signal indicates OFF of the switch. The detector is configured to determine a potential at the communication terminal, to thereby detect the first signal, the second signal, or the third signal in accordance with the determined potential.

According to the battery system mentioned above, the battery pack includes the communication terminal to be coupled to the device-side terminal of the external device. The communication terminal receives the first signal indicating uncoupling of the external device, the second signal indicating ON of the switch, and the third signal indicating OFF of the switch. The first signal has the first potential, the second signal has the second potential, and the third signal has the third potential, and the first potential, the second potential, and the third potential are different from one another. Accordingly, the battery pack can detect one of the first signal, the second signal, and the third signal by determining the potential generated at the communication terminal. That is, the battery pack can detect a greater number of signals related to the external device without increasing the number of terminals.

The external device may include an electric current adjuster configured to increase an electric current flowing in the communication terminal at input of the second signal to the communication terminal as compared with input of the third signal to the communication terminal.

Due to the external device including the electric current adjuster, the electric current flowing in the communication terminal is increased at input of the second signal (hereinafter, an "ON signal") as compared with input of the third signal (hereinafter, an "OFF signal"). This enables a higher noise immunity of an ON signal than a noise immunity of an OFF signal. Thus, detection failure of an ON signal by the battery pack can be reduced.

The battery pack may further include a shut-down outputter configured to generate, at the communication terminal, a fourth potential, to thereby output a fourth signal to the external device. The fourth signal indicates that the battery pack is in a shut-down state. The fourth potential is different from the first potential, the second potential, or the third potential.

The battery pack can output the fourth signal to the external device by generating the fourth potential that is different from the first potential, the second potential, or the third potential. That is, through the single communication terminal, the battery pack can detect the first signal, the second signal, and the third signal, and also can output the fourth signal to the external device. Further, the external device can detect the fourth signal outputted from the battery pack through the device-side communication terminal.

The battery pack may include a potential generator. The potential generator may be configured to generate, at the communication terminal, the first potential based on a positive electrode potential of the battery pack in response to uncoupling of the external device. The potential generator may be configured to generate, at the communication terminal, the second potential based on a positive electrode potential of the battery pack in response to ON of the switch. The potential generator may be configured to generate, at the communication terminal, the third potential based on a positive electrode potential of the battery pack in response to OFF of the switch.

The potential is generated at the communication terminal based on the positive electrode potential of the battery pack by the potential generator, in accordance with uncoupling of the external device, ON of the switch, or OFF of the switch. That is, upon receiving the first signal, the second signal, or the third signal from the communication terminal, a relatively high potential is generated at the communication terminal. Thus, the first signal, the second signal, or the third signal can be easily distinguished from the other signals, and is less likely to be misdetected.

The external device may include a device-side potential generator. The device-side potential generator may be configured to generate, at the communication terminal, the first potential based on a ground potential in response to uncoupling of the external device. The device-side potential generator may be configured to generate, at the communication terminal, the second potential based on a ground potential in response to ON of the switch. The device-side potential generator may be configured to generate, at the communication terminal, the third potential based on a ground potential in response to OFF of the switch.

The potential is generated at the communication terminal based on the ground potential by the device-side potential generator, in accordance with uncoupling of the external device, ON of the switch, or OFF of the switch. That is, upon receiving the first signal, the second signal, or the third signal from the communication terminal, a relatively low potential is generated at the communication terminal. Thus, the first signal, the second signal, or the third signal can be easily distinguished from the other signals, and is less likely to be misdetected.

Particularly, in a case where a potential based on the positive electrode potential of the battery pack is generated at the communication terminal in response to one of the aforementioned three states, and a potential based on the ground potential is generated at the communication terminal in response to another one of the aforementioned three states, a great difference can be achieved between the potentials generated at the communication terminal at input of mutually different signals. Thus, the detector of the battery pack is less likely to misdetect signals related to the external device. Accordingly, a simple configuration of the detector of the battery pack can be achieved.

The battery pack may include a constant current device configured to maintain a constant current consumption of the detector.

The battery pack including the constant current device can maintain the constant current consumption of the detector, regardless of the voltage of the battery pack. That is, in a case of a relatively high voltage of the battery pack, the current consumption of the detector will not increase as compared with a case of a relatively low voltage of the battery pack. Accordingly, a reduced current consumption by the detector can be achieved.

The battery pack may also include a control circuit configured to wake up in response to a change of the determined potential from the first potential to the third potential.

Upon coupling of the external device to the battery pack, the control circuit of the battery pack wakes up. This enables the control circuit to determine whether the battery pack is in a dischargeable state and prepare for discharge, prior to turning ON of the switch of the external device. Thus, a user can use the external device immediately after turning ON the switch of the external device.

The present disclosure can provide one or more of the features found in the following clauses:

A1. A battery pack to supply electric power to an external device, the external device including: an operation device configured to operate by receiving electric power; and a switch configured to instruct operation and stop of the operation device, the battery pack comprising:
a coupling signal communication terminal configured to receive a coupling signal indicating coupling or uncoupling of the external device;
a detector configured to detect coupling or uncoupling of the external device in accordance with the coupling signal received through the coupling signal communication terminal; and
a control circuit configured to wake up in response to a change in a detection result by the detector from uncoupling to coupling of the external device.

If the control circuit of the battery pack operates in a normal operation mode during storage of the battery pack, then electric power consumption of the battery pack will increase. It is thus preferable that the control circuit be in a sleep state to thereby reduce electric power consumption during storage of the battery pack. However, the control circuit of the battery pack does not permit discharge immediately upon wakeup, but first determine upon wakeup whether the battery pack is in a dischargeable state, and then permits discharge. Thus, in a case where the external device is coupled to the battery pack in the sleep state, if the control circuit of the battery pack wakes up after the switch of the external device is turned ON, then a time lag is caused between turning ON of the switch by a user and a usable state of the external device. This may make the user feel uncomfortable.

According to the battery pack in clause A1, upon detection of coupling of the external device, the control circuit of the battery pack wakes up. This enables the control circuit to determine whether the battery pack is in the dischargeable state and prepare for discharge, prior to turning ON of the switch of the external device. Thus, the user can use the external device immediately after turning ON the switch of the external device.

A2. The battery pack as set forth in clause A1, further comprising:
a switch signal communication terminal configured to receive a switch signal indicating whether the switch is ON or OFF,
wherein the detector is configured to detect ON or OFF of the switch in accordance with the switch signal received through the switch signal communication terminal.

The battery pack can detect coupling or uncoupling of the external device, and also can detect ON or OFF of the switch of the external device.

A3. The battery pack as set forth in clause A1 or A2, further comprising:
a shut-down signal communication terminal configured to be coupled to the external device; and
a shut-down outputter configured to output a shut-down signal indicating whether or not the control circuit is in a shut-down state through the shut-down signal communication terminal.

The battery pack can output the shut-down signal to the external device.

A4. The battery pack as set forth in any one of clauses A1 to A3,
wherein the coupling signal communication terminal and the switch signal communication terminal are configured as a single communication terminal that is configured to receive the coupling signal and the switch signal, the single communication terminal being configured such that respective different potentials for the coupling signal and the switch signal are generated at the single communication terminal, and
wherein the detector is configured to determine a potential at the single communication terminal, and
wherein the detector is configured to detect the coupling signal or the switch signal in accordance with the determined potential.

The battery pack can detect coupling or uncoupling of the external device and ON or OFF of the switch of the external device through the single communication terminal, and thus enables reduction in the number of terminals of the battery pack.

A5. The battery pack as set forth in any one of clauses A1 to A4,
wherein the coupling signal communication terminal, the switch signal communication terminal, and the shut-down signal communication terminal are configured as a single communication terminal that is configured to receive the coupling signal and the switch signal as well as to output the shut-down signal, is the single communication terminal being configured such that respective different potentials for the coupling signal, the switch signal, and the shut-down signal are generated at the single communication terminal, and
wherein the battery pack further includes a shut-down outputter configured to generate, at the single communication terminal, an additional potential different from the potential indicating the coupling signal or the potential indicating the switch signal, to thereby output the shut-down signal to the external device through the single communication terminal.

Through the single communication terminal, the battery pack can detect coupling or uncoupling of the external device and ON or OFF of the switch of the external device, and also can output the shut-down signal to the external device.

A6. The battery pack as set forth in clause A5 or A6, further comprising:

a potential generator configured to generate, at the single communication terminal, a potential based on a positive electrode potential of the battery pack, in accordance with a coupled state of the external device.

A7. The battery pack as set forth in any one of clauses A1 to A6, further comprising:

a constant current device configured to maintain a constant current consumption of the detector.

B1. A battery system comprising:

an external device; and the battery pack as set forth in any one of clauses A1 to A7, wherein the external device includes:

an operation device configured to operate by receiving electric power;

a switch configured to instruct operation and stop of the operation device; and a device-side communication terminal to communicate with the battery pack.

B2. The battery system as set forth in clause B1, wherein the external device includes an electric current adjuster configured to increase an electric current flowing in the switch signal communication terminal at input of the switch signal indicating ON of the switch to the switch signal communication terminal as compared with input of the switch signal indicating OFF of the switch to the switch signal communication terminal.

B3. The battery system as set forth in clause B1 or B2, wherein the external device includes a device-side potential generator configured to generate, at the single communication terminal, a potential based on a ground potential, in accordance with the switch signal indicating ON of the of the switch.

BRIEF DESCRIPTION OF THE DRAWINGS

Some embodiments of the present disclosure will be described hereinafter by way of example with reference to the accompanying drawings, in which:

FIG. 6 is a truth table showing operations of a communication circuit in the first embodiment;

FIG. 10 is a truth table showing operations of a communication circuit in the second embodiment;

DETAILED DESCRIPTION OF EXEMPLARY EMBODIMENTS

First Embodiment

<1. Configuration of Battery Pack>

First, a description will be given of a configuration of a battery system 900 that includes a battery pack 100 of a first embodiment and an external device 600 to which the battery pack 100 is coupled with reference to FIGS. 1 and 2. The battery pack 100 supplies electric power to the external device 600, or receives electric power from the external device 600. The external device 600 may include, for example, an electric working machine and a light each including an operation device 700 configured to operate by receiving electric power. Examples of the electric working machine may include an electric power tool, such as a hammer drill, a chainsaw, and a grinder, as well as a grass cutter, a hedge trimmer, and a trimmer. The external device 600 may include a charger to supply electric power to the battery pack 100. FIG. 2 shows an example in which the external device 600 is an electric working machine that receives electric power from the battery pack 100.

Figure 1:
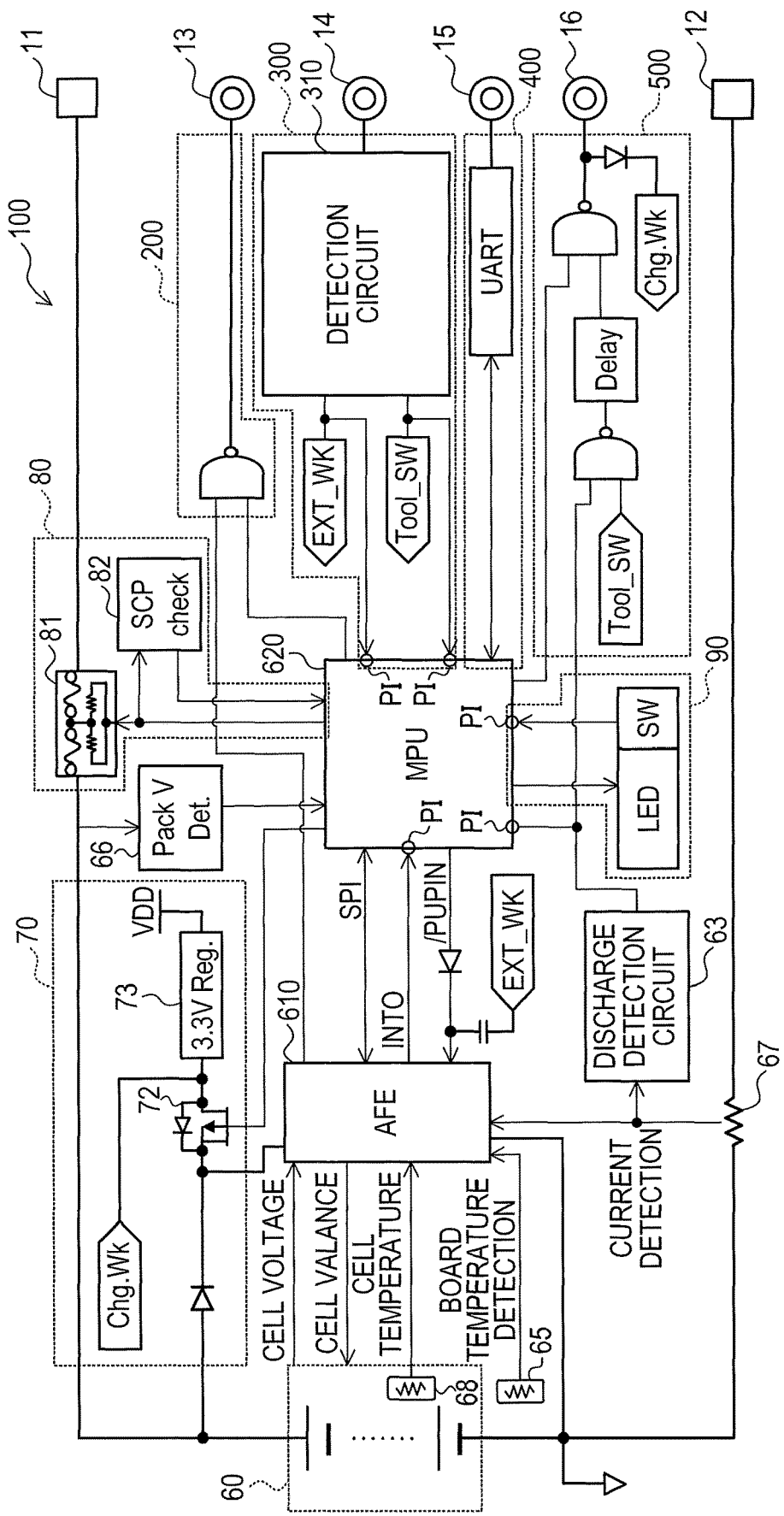
FIG. 1 is a block diagram showing a configuration of a battery pack in a first embodiment.
Figure 2:
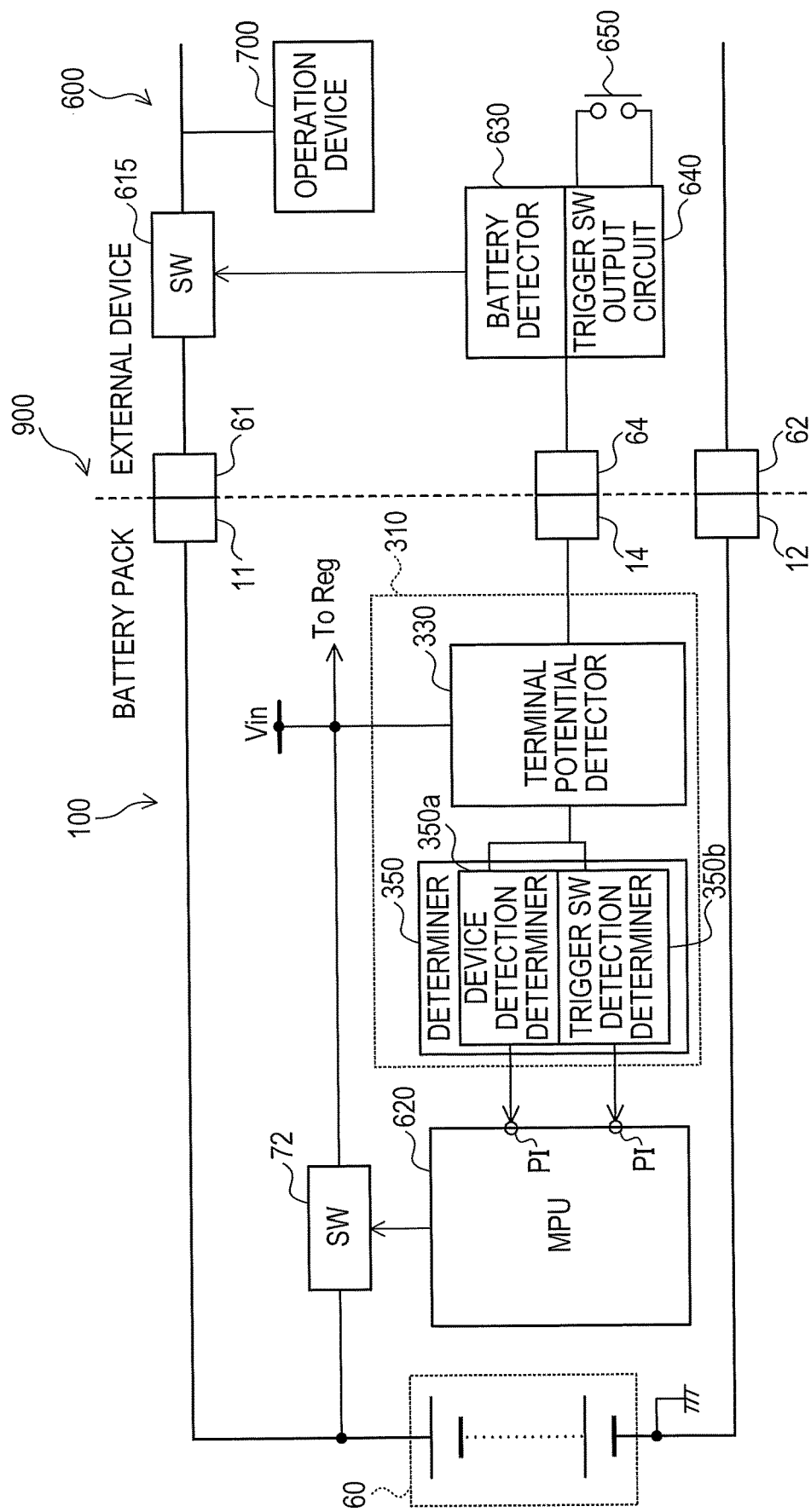
FIG. 2 is a block diagram schematically showing a battery system in the first embodiment.

As shown in FIG. 1, the battery pack 100 includes a battery 60, an Analog Front End (hereinafter, "AFE") 610, a Micro Processing Unit (hereinafter, "MPU") 620, a discharge detection circuit 63, a battery voltage detector 66, a power supply circuit 70, a Self Control Protector (hereinafter, "SCP") 80, and a sub-printed circuit board controller (hereinafter, "sub-PCB controller") 90.

The battery pack 100 also includes a positive terminal 11, a negative terminal 12, a CS terminal 13, a DT terminal 14, a TR terminal 15, a DS terminal 16, a charge circuit 200, a detector 300, a communicator 400, and a discharge circuit 500.

The battery 60 includes serially connected battery cells. The battery 60 may be, for example, a lithium ion battery. The battery 60 has a rated voltage of, for example, 18 V. The battery 60 may have a rated voltage of, for example, 36 V or 72 V, instead of 18 V.

The MPU 620 includes a microcomputer provided with, a CPU, a ROM, a RAM, an I/O, and other components, and executes various controls, including charge/discharge control of the battery 60. The MPU 620 also includes five interrupt ports PI to which various signals are inputted. If turning-OFF of a trigger switch 650 (see FIG. 2) of the external device 600 is detected by the below-described detector 300, and specified conditions are satisfied, then the MPU 620 changes from a normal operation mode to a sleep mode in which its operation is partially stopped to reduce electric power consumption. If a signal is inputted to any one of the interrupt ports PI during the sleep mode, then the MPU 620 wakes up and enters the normal operation mode. For example, the MPU 620 wakes up when turning-ON of the trigger switch 650 of the external device 600 is detected by the below-described detector 300, and an ON signal is inputted through the interrupt port PI. Also, the MPU 620 enters the sleep mode when turning-OFF of the trigger switch 650 is detected by the detector 300, and specified conditions are satisfied.

The AFE 610, which is an analog circuit, detects cell voltages of respective battery cells included in the battery 60 and also detects a cell temperature of at least one battery cell via a thermistor 68, in accordance with instructions from the MPU 620. The AFE 610 also executes a cell balancing process of equalizing remaining energy of the battery cells. The AFE 610 detects a board temperature via a thermistor 65. The AFE 610 also detects, via a shunt resistor 67, a charge current flowing into the battery 60 and a discharge current flowing from the battery 60. Then, the AFE 610 converts detected values of the cell voltages, the cell temperature, the board temperature, and the charge/discharge current into digital signals and outputs the converted digital signals to the MPU 620.

Also, the AFE 610 determines whether to permit or prohibit charge of the battery 60 based on a detected state of the battery 60, and then generates a charge permission signal or a charge prohibition signal, and outputs the signal to the charge circuit 200.

The discharge detection circuit 63 detects a discharge current flowing from the battery 60 via the shunt resistor 67, and detects whether a discharge current of a specified value or greater is flowing. The discharge detection circuit 63 outputs a discharge-ON signal to the discharge circuit 500 if a discharge current of the specified value or greater is flowing, and outputs a discharge-OFF signal to the discharge circuit 500 if a discharge current of the specified value or greater is not flowing. The discharge detection circuit 63 also outputs the discharge-ON signal or discharge-OFF signal to the MPU 620 through the interrupt port PI.

The battery voltage detector 66 detects a battery voltage, which is a voltage between both terminals of the battery 60, and outputs the detected battery voltage to the MPU 620. The MPU 620 determines whether the battery voltage detected by the battery voltage detector 66 is equal to a total value of the cell voltages detected by the AFE 610.

The power supply circuit 70 includes a switch 72 and a regulator 73. The MPU 620 shuts down when the battery 60 has entered an over-discharge state. In a shut-down state of the MPU 620, the regulator 73 receives auxiliary power supply from the charger through the DS terminal 16, thereby generating a power supply voltage VDD for driving an internal circuit. Upon receiving the power supply voltage VDD generated by the regulator 73, the MPU 620 wakes up from the shut-down state, and outputs a charge permission signal to the charger if the battery is in a chargeable state. Also, the MPU 620 turns ON the switch 72 when the battery voltage has reached a specified voltage. When the switch 72 is turned ON, the regulator 73 receives electric power from the battery 60 and generates the power supply voltage VDD.

The SCP 80 includes an SCP circuit 81 and an SCP checker 82. The SCP circuit 81 is arranged on a positive connection line connecting a positive end of the battery 60 and the positive terminal 11. The SCP circuit 81 includes a fuse, and melts the fuse in response to instructions from the MPU 620. Melting of the fuse of the SCP circuit 81 results in disconnection of the positive connection line, and thus disables charge and discharge of the battery 60. That is, the battery 60 becomes non-reusable.

In a case where charge is not stopped despite output of a charge prohibition signal from the battery pack 100, or where discharge is not stopped despite output of a discharge prohibition signal from the battery pack 100, the MPU 620 provides instructions to the SCP circuit 81 to melt the fuse as a last resort to ensure safety. That is, the SCP circuit 81 is for the purpose of doubly ensuring safety against an over-charge state and an over-discharge state of the battery 60. The SCP checker 82 periodically checks whether the SCP circuit 81 operates normally, and outputs check results to the MPU 620.

The sub-PCB controller 90 includes an LED and a switch. When operated by a user, the switch outputs an operation signal to the MPU 620 through the interrupt port PI. Upon receiving the operation signal, the MPU 620 detects an operation of the switch, and lights the LED in accordance with a remaining energy of the battery. The remaining energy of the battery may be calculated from the above-described battery voltage, or may be calculated from an integrated value of the charge/discharge current. Alternatively, the remaining energy of the battery may be calculated using both of the battery voltage and the integrated value of the charge/discharge current.

The MPU 620 determines the state of the battery 60 based on various inputted signals. Then, the MPU 620 determines whether to permit or prohibit charge of the battery 60 based on the determined state of the battery 60, and generates a charge permission signal or a charge prohibition signal and outputs the generated signal to the charge circuit 200. Also, the MPU 620 determines whether to permit or prohibit discharge from the battery 60 based on the determined state of the battery 60, and generates a discharge permission signal or a discharge prohibition signal and outputs the generated signal to the discharge circuit 500. Further, the MPU 620 may continuously generate a discharge permission signal and outputs the generated signal to the discharge circuit 500 during the sleep mode, in order to ensure high responsiveness to the external device 600 (specifically, the electric working machine).

As shown in FIG. 2, the positive terminal 11 and the negative terminal 12 are connected respectively to a device-side positive terminal 61 and a device-side negative terminal 62 of the external device 600, upon coupling of the battery pack 100 to the external device 600. This enables supply of electric power from the battery pack 100 to the external device 600. In a case where the external device 600 is a charger, supply of electric power from the external device 600 to the battery pack 100 is enabled.

The CS terminal 13, which is connected to the charge circuit 200, outputs a charge permission signal or a charge prohibition signal to the external device 600 upon coupling of the battery pack 100 to the external device 600 (specifically, the charger). The charge circuit 200 includes an NAND circuit, and outputs a charge permission signal through the CS terminal 13 upon input of charge permission signals from both of the AFE 610 and the MPU 620. Also, the charge circuit 200 outputs a charge prohibition signal through the CS terminal 13 upon receiving a charge prohibition signal from at least one of the AFE 610 or the MPU 620.

As shown in FIG. 2, the DT terminal 14 is connected to a device-side communication terminal 64 of the external device 600 upon coupling of the battery pack 100 to the external device 600. The external device 600 here is an electric working machine including an operation device 700 (for example, a motor) that operates by receiving electric power from the battery pack 100. The external device 600 includes the trigger switch 650, a trigger switch output circuit 640, a battery detector 630, and a discharge switch 615.

The trigger switch 650 is a manipulation device to be manipulated by a user for instructing operation and stop of the operation device 700. The device-side communication terminal 64 is connected to the trigger switch 650 through the trigger switch output circuit 640. The device-side communication terminal 64 is also connected to the battery detector 630. The trigger switch output circuit 640 outputs an ON signal or an OFF signal depending on ON/OFF of the trigger switch 650. Thus, a potential $V_{DT}$ at the device-side communication terminal 64 and the DT terminal 14 changes depending on whether the trigger switch 650 is ON or OFF. Also, the potential $V_{DT}$ at the DT terminal 14 changes depending on whether the external device 600 is in an uncoupled state or in a coupled state. Further, the potential $V_{DT}$ at the device-side communication terminal 64 and the DT terminal 14 changes depending on whether the battery pack 100 is in a shut-down state or in a non-shut-down state.

The battery detector 630 determines whether the potential $V_{DT}$ at the device-side communication terminal 64 and the DT terminal 14 is a potential indicating the shut-down state, or a potential indicating the non-shut-down state, of the battery pack 100. The battery detector 630 detects shut-down information indicating whether or not the battery pack 100 is in the shut-down state, based on the determination result. Upon detection that the battery pack 100 is in the non-shut-down state, the battery detector 630 turns ON the discharge switch 615 arranged on the positive connection line. The positive connection line is connected to the device-side positive terminal 61. This enables supply of electric power from the battery pack 100 to a regulator of the external device 600, and thus a power supply voltage for driving the internal circuit of the external device 600 is generated. Upon detection that the battery pack 100 is in the shut-down state, the battery detector 630 turns OFF the discharge switch 615.

The DT terminal 14 is connected to the detector 300 of the battery pack 100. The detector 300 includes a detection circuit 310. The detection circuit 310 includes a terminal potential detector 330 and a determiner 350. The determiner 350 includes a device detection determiner 350a and a trigger switch detection determiner 350b. The terminal potential detector 330 detects a potential $V_{DT}$ at the DT terminal 14. The device detection determiner 350a determines whether or not the potential $V_{DT}$ detected by the terminal potential detector 330 is a potential indicating that the external device 600 is in the uncoupled state with the battery pack 100, thereby detecting the uncoupled state or the coupled state of the external device 600. Then, the device detection determiner 350a outputs the detection result to the MPU 620 through the interrupt port PI, and also outputs the detection result to the AFE 610. The trigger switch detection determiner 350b determines whether the potential $V_{DT}$ detected by the terminal potential detector 330 indicates ON or OFF of the trigger switch 650, thereby detecting whether the trigger switch 650 is ON or OFF. Then, the trigger switch detection determiner 350b outputs the detection result to the MPU 620 through the interrupt port PI, and also outputs the detection result to the discharge circuit 500.

The MPU 620 obtains device signals, including an uncoupling signal, an OFF signal, and an ON signal, based on the inputted detection results. The uncoupling signal indicates that the external device 600 is in the uncoupled state with the battery pack 100. The OFF signal indicates that the external device 600 is coupled to the battery pack 100, and also the trigger switch 650 is OFF. The ON signal indicates that the external device 600 is coupled to the battery pack 100, and also the trigger switch 650 is ON. A method for detecting the uncoupling signal, the OFF signal, the ON signal, and a shut-down signal will be detailed below.

The TR terminal 15 is a serial communication terminal connected to the communicator 400. The communicator 400 includes a half-duplex Universal Asynchronous Receiver/Transmitter (UART) circuit. The MPU 620 performs serial communications with the external device 600 through the communicator 400 and the TR terminal 15.

The DS terminal 16, which is connected to the discharge circuit 500, outputs a discharge permission signal or a discharge prohibition signal to the external device 600 (specifically, the electric working machine) when the battery pack 100 is connected to the external device 600. The discharge circuit 500 includes two NAND circuits and a delay circuit. The discharge circuit 500 outputs a discharge permission signal or a discharge prohibition signal through the DS terminal 16, based on the discharge permission signal or the discharge prohibition signal inputted from the MPU 620, the detection result inputted from the discharge detection circuit 63, and the detection result of the trigger switch 650 inputted from the detection circuit 310. Also, the DS terminal 16 receives auxiliary power supply from the external device 600 when the battery pack 100 in the shut-down state is coupled to the external device 600 (specifically the charger).

<2. Detection Principle>

Next, a description will be given of a detection principle of the three device signals, i.e., the uncoupling signal, the OFF signal, and the ON signal, as well as the shut-down signal of the battery pack 100 with reference to FIGS. 3 and 4. The uncoupling signal, the OFF signal, and the ON signal are transmitted from the external device 600 to the battery pack 100, and received by the battery pack 100. On the other hand, the shut-down signal is transmitted from the battery pack 100 to the external device 600, and received by the external device 600.

Figure 3:
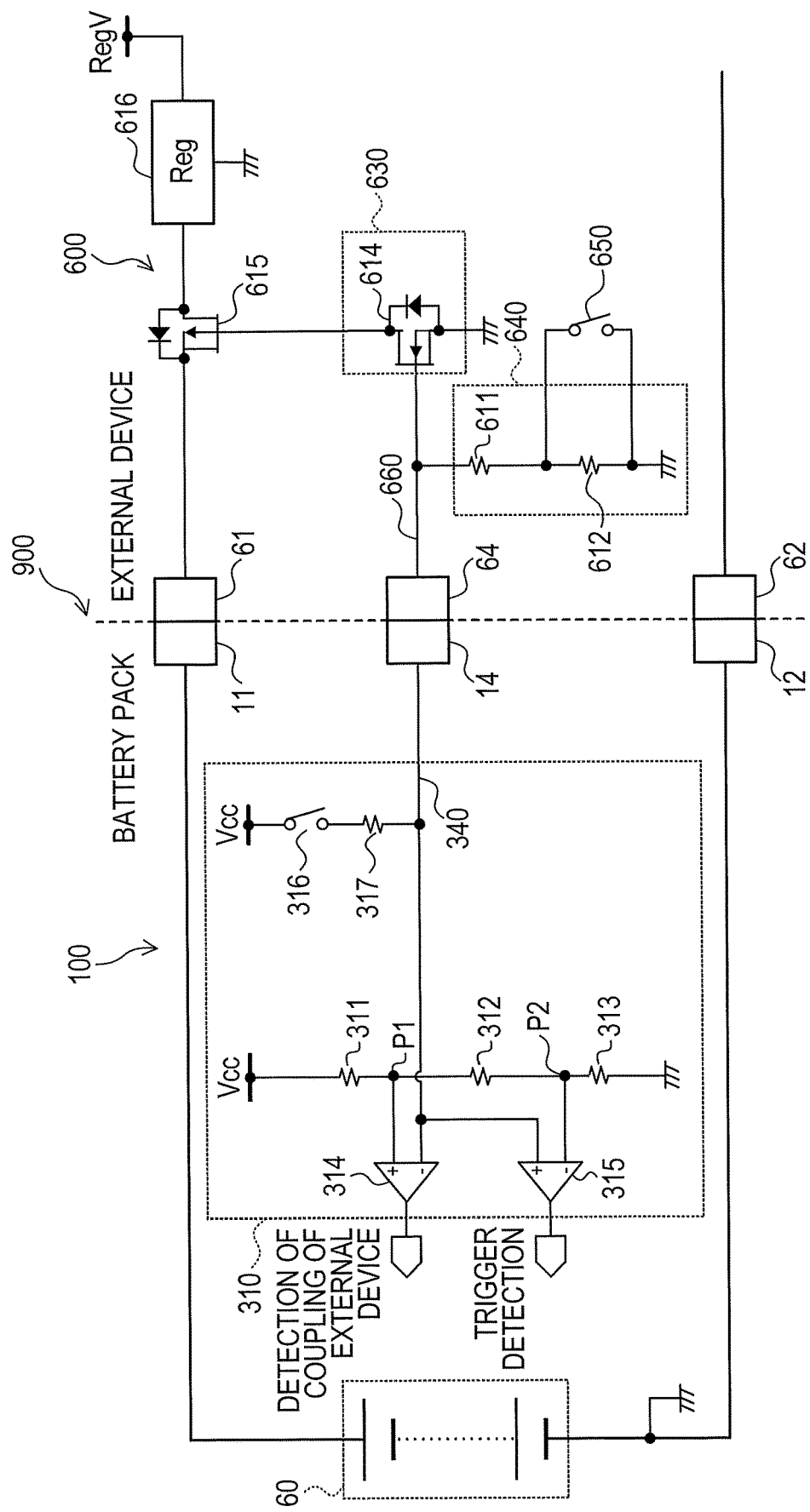
FIG. 3 is a block diagram showing a detection principle of a plurality of device signals in the first embodiment.

As shown in FIG. 3, the detection circuit 310 in the battery pack 100 includes a connection line 340, voltage dividing resistors 311, 312, 313, a coupling detection comparator 314, a trigger detection comparator 315, an output switch 316, and an output resistor 317.

The connection line 340 includes a first end and two branched second ends. The first end of the connection line 340 is connected to the DT terminal 14. The two second ends of the connection line 340 are individually connected to an inverting input terminal of the coupling detection comparator 314 and a non-inverting input terminal of the trigger detection comparator 315. Thus, the potential $V_{DT}$ is inputted to the inverting input terminal of the coupling detection comparator 314 and to the non-inverting input terminal of the trigger detection comparator 315.

The voltage dividing resistor 311 is connected to a power source Vcc, and the voltage dividing resistor 313 is connected to the ground. The voltage dividing resistor 311, the voltage dividing resistor 312, and the voltage dividing resistor 313 are serially connected. A connection point P1 of the voltage dividing resistor 311 and the voltage dividing resistor 312 is connected to the non-inverting input terminal of the coupling detection comparator 314. A connection point P2 of the voltage dividing resistor 312 and the voltage dividing resistor 313 is connected to the inverting input terminal of the trigger detection comparator 315.

A first end of the output switch 316 is connected to the power source Vcc, and a second end of the output switch 316 is connected to a first end of the output resistor 317. A second end of the output resistor 317 is connected to the connection line 340. The output switch 316 is OFF when the battery pack 100 is in the shut-down state, and is ON when the battery pack 100 is in the non-shut-down state.

The trigger switch output circuit 640 in the external device 600 includes circuit resistors 611, 612. The circuit resistor 611 is connected to a connection line 660 that is connected to the device-side communication terminal 64. The circuit resistor 612 is serially connected to the circuit resistor 611 and is also connected to the ground. The trigger switch 650 is parallelly connected to the circuit resistor 612. Thus, when the trigger switch 650 is ON, short-circuit occurs between both terminals of the circuit resistor 612.

The battery detector 630 includes a detection switch 614. The detection switch 614 includes an N-channel Metal-Oxide-Semiconductor Field-Effect Transistor (MOSFET). The discharge switch 615 includes a P-channel MOSFET. The detection switch 614 includes a gate terminal connected to the connection line 660 and a source terminal connected to the ground. A drain terminal of the detection switch 614 is connected to a gate terminal of the discharge switch 615. A source terminal of the discharge switch 615 is connected to the positive connection line connected to the device-side positive terminal 61. A drain terminal of the discharge switch 615 is connected to a regulator 616.

Figure 4:
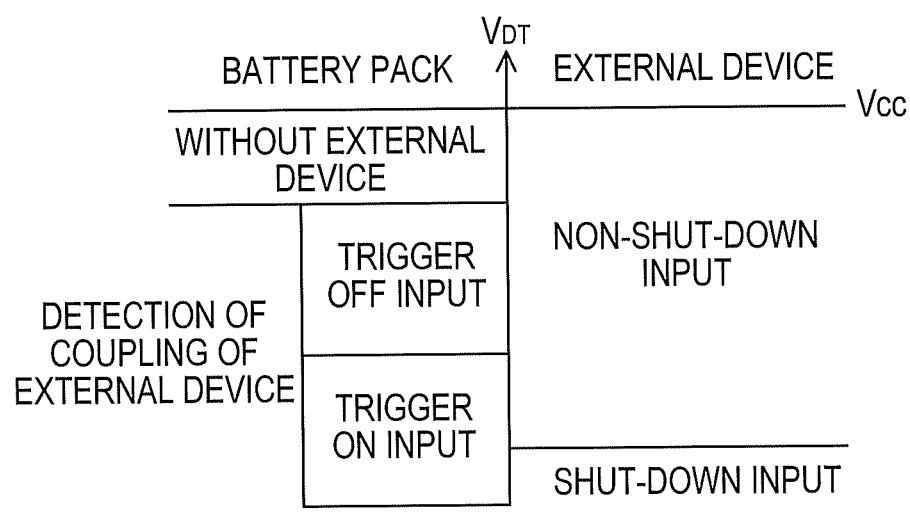
FIG. 4 is a view showing a correspondence relationship among the plurality of device signals and a potential at a communication terminal in the first embodiment.

FIG. 4 shows a correspondence relationship between the potential $V_{DT}$, and a state of the external device 600 and a state of the battery pack 100 in the present detection principle.

First, a description will be given of the potential $V_{DT}$ when the battery pack 100 is in the non-shut-down state (that is, when the output switch 316 is ON).

If the external device 600 is in the uncoupled state with the battery pack 100, then the potential $V_{DT}$ is Vcc.

If the external device 600 is in the coupled state with the battery pack 100 and the trigger switch 650 is OFF, then electric current flows from the power source Vcc through the output switch 316, the output resistor 317, the DT terminal 14, the device-side communication terminal 64, the circuit resistor 611, and the circuit resistor 612. Resistance values of the output resistor 317, the circuit resistor 611, and the circuit resistor 612 are Ma, Mb, Mc, respectively. In this case, the potential $V_{DT}$ is as follows:

$$V10=\{(Mb+Mc)/(Ma+Mb+Mc)\}Vcc.$$

If the external device 600 is in the coupled state with the battery pack 100 and the trigger switch 650 is ON, then electric current flows from the power source Vcc through the output switch 316, the output resistor 317, the DT terminal 14, the device-side communication terminal 64, the circuit resistor 611, and the trigger switch 650. Thus, the potential $V_{DT}$ is as follows:

$$V11=\{Mb/(Ma+Mb)\}Vcc.$$

In this case, $V11<V10$.

It is preferable that the ON signal of the trigger switch 650 is transmitted with high reliability. For this purpose, the resistance value Mc is set to a relatively great value, which is substantially greater (for example, at least one digit greater) than the resistance value Ma or Mb. Thus, electric current flowing through the DT terminal 14 and the device-side communication terminal 64 is largely increased while the trigger switch 650 is ON as compared with a case where the trigger switch 650 is OFF. Accordingly, an ON signal of the trigger switch 650 has a higher noise immunity than an OFF signal and is transmitted with high reliability.

If the battery pack 100 is in the shut-down state, and also the external device 600 is coupled to the battery pack 100, then the output switch 316 is OFF. Thus, the DT terminal 14 is connected to the ground through the circuit resistor 611 and the circuit resistor 612 in the external device. Accordingly, the potential $V_{DT}$ is a ground potential. If the battery pack 100 is in the shut-down state, and the external device 600 is not coupled to the battery pack 100, then the DT terminal 14 is not connected to anywhere (that is, open).

Resistance values of the voltage dividing resistor 311, the voltage dividing resistor 312, and the voltage dividing resistor 313 are set to be Vcc>VP1>V10, as well as V10>VP2>V11. VP1 is a potential at the connection point P1, and VP2 is a potential at the connection point P2.

With this configuration, output of the coupling detection comparator 314 is High (hereinafter, "H") or Low (hereinafter, "L") depending on whether the external device 600 is in the uncoupled state. When the external device 600 is in the coupled state, output of the trigger detection comparator 315 is H if the trigger switch 650 is OFF, or is L if the trigger switch 650 is ON. Accordingly, the MPU 620 can obtain a uncoupling signal, an OFF signal, and ON signal based on the outputs from the coupling detection comparator 314 and the trigger detection comparator 315.

If the battery pack 100 is in the non-shut-down state, and also the external device 600 is in the coupled state, then the potential at the DT terminal 14 is V11 or greater, and thus the detection switch 614 is turned ON. Then, the gate terminal of the discharge switch 615 has a ground potential, and thus the discharge switch 615 is turned ON. On the other hand, if the battery pack 100 is in the shut-down state, and also the external device 600 is in the coupled state, then the potential at the DT terminal 14 is a ground potential, and thus the detection switch 614 is turned OFF. Thus, the discharge switch 615 is turned OFF. That is, the battery detector 630 detects a shut-down signal based on the potential $V_{DT}$ and controls ON/OFF of the discharge switch 615.

In the present detection principle, the detection circuit 310 corresponds to one example of the detector of the present disclosure, the output switch 316 corresponds to one example of the shut-down outputter of the present disclosure, and the circuit resistor 612 corresponds to one example of the electric current adjuster of the present disclosure.

<3. Configuration of Communication Circuit>

Figure 5:
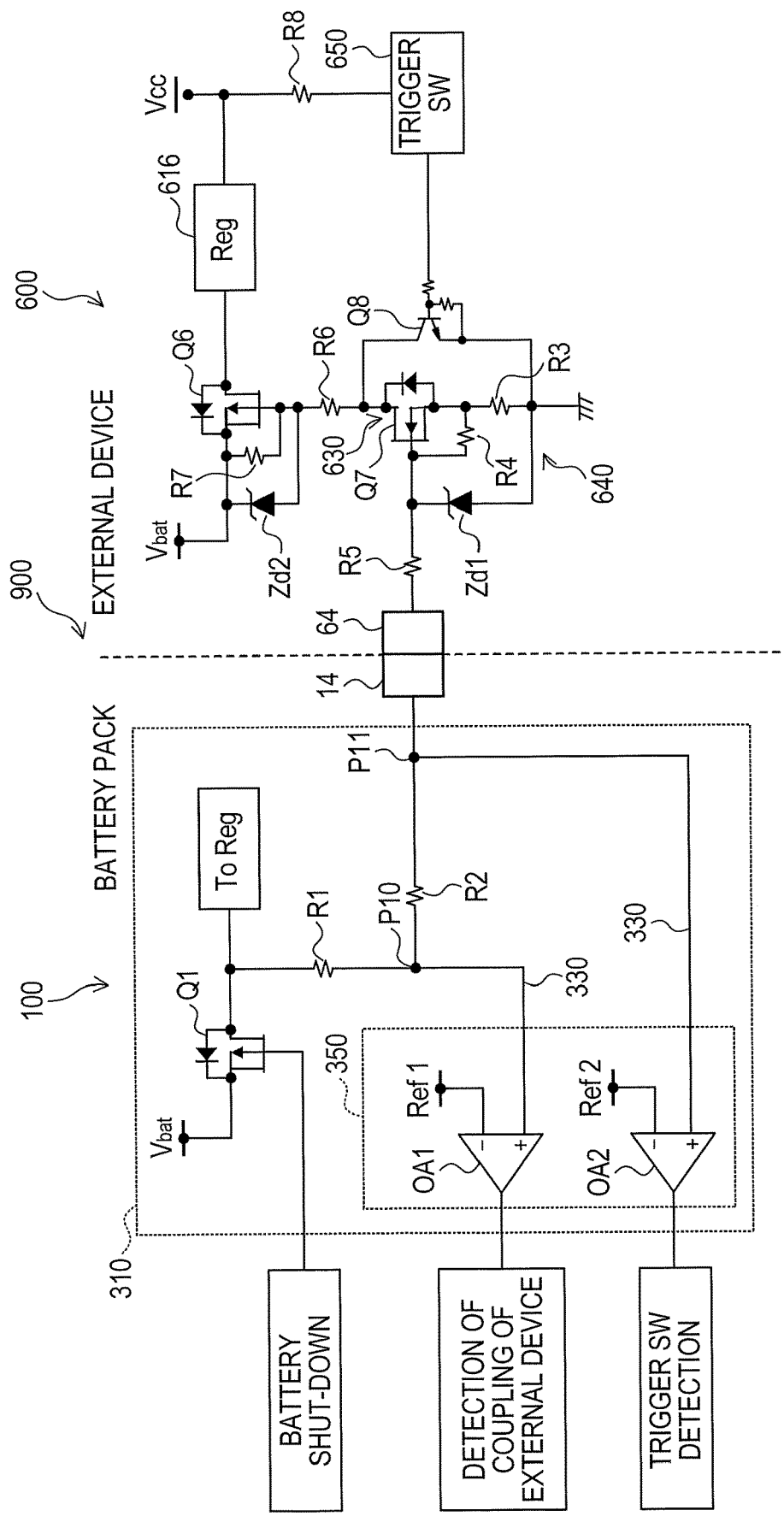
FIG. 5 is a communication circuit diagram of the battery system in the first embodiment.

With reference to FIG. 5, a description will be given of a specific configuration of a communication circuit of the battery pack 100 and the external device 600 that achieves the detection principle in the first embodiment.

In the battery pack 100, the detection circuit 310 includes the determiner 350, resistors R1 and R2, and a switch Q1. The determiner 350 includes comparators OA1 and OA2.

The switch Q1 includes a P-channel MOSFET. A source terminal of the switch Q1 is connected to the positive end of the battery 60, and a drain terminal of the switch Q1 is connected to a regulator. If the battery pack 100 is in the shut-down state, then an H signal is applied to a gate terminal of the switch Q1, and the switch Q1 is turned OFF. If the battery pack 100 is in the non-shut-down state, then an L signal is applied to the gate terminal of the switch Q1, and the switch Q1 is turned ON.

A first end of the resistor R1 is connected to the drain terminal of the switch Q1, and a first end of the resistor R2 is connected to the DT terminal 14. A second end of the resistor R1 and a second end of the resistor R2 are connected to each other.

A reference power source Ref1 with a voltage Vr1 is connected to an inverting input terminal of the comparator OA1. A connection point P10 of the resistor R1 and the resistor R2 is connected to a non-inverting input terminal of the comparator OA1. A reference power source Ref2 with a voltage Vr2 is connected to an inverting input terminal of the comparator OA2. A connection point P11 of the resistor R2 and the DT terminal 14 is connected to a non-inverting input terminal of the comparator OA2. Output terminals of the comparators OA1, OA2 are connected to the MPU 620.

In the external device 600, the trigger switch output circuit 640 includes a Zener diode Zd1, resistors R3 and R4, and a switch Q8. The switch Q8 includes an npn-type bipolar transistor. The battery detector 630 includes a switch Q7, which includes an N-channel MOSFET. Further, the external device 600 includes a switch Q6, resistors R5, R6, R7, and R8, and a Zener diode Zd2. The switch Q6 includes a P-channel MOSFET. The Zener diode Zd1 has a Zener voltage of Vd1, and the Zener diode Zd2 has a Zener voltage of Vd2.

A first end of the resistor R5 is connected to the device-side communication terminal 64. A second end of the resistor R5 is connected to a cathode terminal of the Zener diode Zd1, a first terminal of the resistor R4, and a gate terminal of the switch Q7. A second terminal of the resistor R4 and a source terminal of the switch Q7 are connected to a first terminal of the resistor R3. An anode terminal of the Zener diode Zd1 and a second terminal of the resistor R3 are connected to the ground.

A collector terminal of the switch Q8 is connected to a drain terminal of the switch Q7, and an emitter terminal of the switch Q8 is connected to a second terminal of the resistor R3. That is, the switch Q8 is connected parallelly to the switch Q7 and the resistor R3 that are serially connected to each other. The resistors R3, R4 each have a relatively large resistance value.

A base terminal of the switch Q8 is connected to the power source Vcc through the trigger switch 650 and a resistor R8. When the trigger switch 650 is turned ON, electric current flows from the power source Vcc to a base terminal of the switch Q8, and the switch Q8 is turned ON. When the trigger switch 650 is turned OFF, the switch Q8 is turned OFF.

A source terminal of the switch Q6 is connected to the positive end of the battery 60, and a drain terminal of the switch Q6 is connected to the regulator 616. A gate terminal of the switch Q6 is connected to a first terminal of the resistor R6. A second terminal of the resistor R6 is connected to a drain terminal of the switch Q7 and a collector terminal of the switch Q8.

The resistor R7 and the Zener diode Zd2 are parallely connected between the source terminal and the gate terminal of the switch Q6. An anode terminal of the Zener diode Zd2 is connected to the gate terminal of the switch Q6, and a cathode terminal of the Zener diode Zd2 is connected to the source terminal of the switch Q6.

The voltages Vr1, Vr2 of the reference power sources Ref1, Ref2 are set to satisfy 0<Vr2<Vd1<Vr1<Vbat. Vbat represents a potential at the positive end of the battery 60.

Next, a description will be given of operations of the communication circuit in the first embodiment with reference to FIGS. 5 and 6.

First, a description will be given of a case where the battery pack 100 is in the non-shut-down state (that is, the switch Q1 is ON).

If the external device 600 is in the uncoupled state, the potential $V_{DT}$ is Vbat. In this case, the potential Vr1 at the inverting input terminal of the comparator OA1 is lower than the potential Vbat at the non-inverting input terminal, and thus the output of the comparator OA1 is "H". Also, the potential Vr2 at the inverting input terminal of the comparator OA2 is lower than the potential Vbat of the non-inverting input terminal, and thus the output of the comparator OA2 is "H".

If the external device 600 is in the coupled state, and also the trigger switch 650 is OFF, then the switch Q8 is OFF, and the potential $V_{DT}$ is substantially Vd1. Also, the switch Q7 and the switch Q6 are ON. The potential Vr1 at the inverting input terminal of the comparator OA1 is higher than the potential Vd1 at the non-inverting input terminal, and thus the output of the comparator OA1 is "L". Also, the potential Vr2 at the inverting input terminal of the comparator OA2 is lower than the potential Vd1 at the non-inverting input terminal, and thus the output of the comparator OA2 is "H".

If the external device 600 is in the coupled state, and also the trigger switch 650 is ON, then the switch Q8 is ON, and thus the switch Q7 and the switch Q6 are ON. As a result, the potential $V_{DT}$ is approximately zero. The potential Vr1 at the inverting input terminal of the comparator OA1 is higher than the zero potential of the non-inverting input terminal, and thus output of the comparator OA1 is "L". Also, the potential Vr2 of the inverting input terminal of the comparator OA2 is higher than the zero potential of the non-inverting input terminal, and thus the output of the comparator OA2 is "L".

Accordingly, the MPU 620 can obtain an uncoupling signal, an OFF signal, and an ON signal in accordance with a combination of the outputs of the comparators OA1 and OA2.

Next, in a case where the battery pack 100 is in the shut-down state, and also the external device 600 is in the coupled state, the switch Q1 is OFF, and thus the DT terminal 14 is connected to the ground through the resistors R5, R4, and R3. Thus, the potential $V_{DT}$ is a ground potential, and the switch Q7 and the switch Q6 are OFF. That is, the switch Q7 is ON if the battery pack 100 is in the non-shut-down state, while the switch Q7 is OFF if the battery pack 100 is in the shut-down state. On the other hand, if the battery pack 100 is in the shut-down state, and also the external device 600 is in the uncoupled state, then the switch Q1 is OFF, and thus the potential $V_{DT}$ is an open potential.

In this communication circuit, the switch Q1 corresponds to one example of a shut-down outputter of the present disclosure, and the resistors R3, R4 each correspond to one example of an electric current adjuster of the present disclosure.

<4. Effects>

The first embodiment as described above achieves the following effects:

(1) At the DT terminal 14, different potentials are generated depending on the inputted device signals. Thus, by determining the potential generated at the DT terminal 14, the battery pack 100 can detect a device signal in accordance with the determined potential. That is, the battery pack 100 can detect more signals related to the external device 600 without increasing the number of terminals.

(2) The battery pack 100 can detect an uncoupling signal, an OFF signal, and an ON signal through the DT terminal 14. Accordingly, the battery pack 100 can detect that the external device 600 has changed from the uncoupled state to the coupled state.

(3) The battery pack 100 can generate, at the DT terminal 14, a potential different from a potential representing an uncoupling signal, an OFF signal, or an ON signal, thereby outputting a shut-down signal to the external device 600. That is, the battery pack 100 can detect an uncoupling signal, an OFF signal, and an ON signal through the DT terminal 14, and also can output a shut-down signal to the external device 600. Also, the external device 600 can detect a shut-down signal depending on the potential at the DT terminal 14.

(4) By adjusting the resistance value of the trigger switch output circuit 640 of the external device 600, the electric current flowing through the DT terminal 14 is increased during input of an ON signal to the DT terminal 14 as compared with input of an OFF signal to the DT terminal 14. This enables a higher noise immunity of an ON signal than a noise immunity of an OFF signal, and thus enables reduction in detection failure of an ON signal by the battery pack 100.

Second Embodiment

Since a second embodiment has a similar basic configuration to that of the first embodiment, common configurations will not be further described and differences will be mainly described. The same reference numerals as in the first embodiment represent the same configurations, and reference will be made to the previous descriptions thereof.

<1. Detection Principle>

Next, a description will be given of a detection principle of three device signals, i.e., an uncoupling signal, an OFF signal, and an ON signal, as well as a shut-down signal according to the second embodiment, focusing differences from the detection principle of the first embodiment, with reference to FIGS. 7 and 8.

Figure 7:
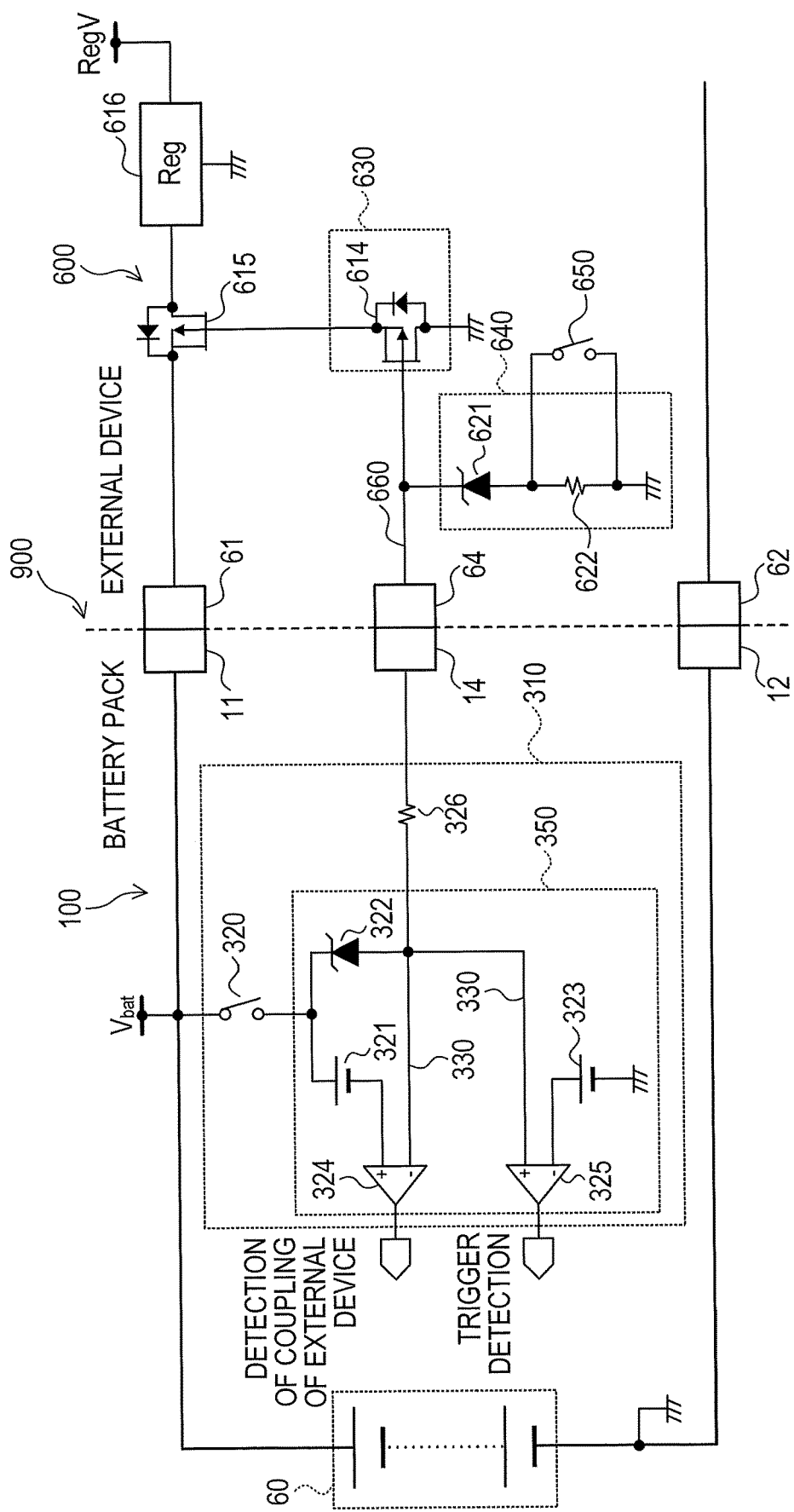
FIG. 7 is a block diagram showing a detection principle of a plurality of device signals in a second embodiment.

As shown in FIG. 7, in the battery pack 100, the detection circuit 310 includes a battery switch 320, a power source 321, a power source 323, a Zener diode 322, a coupling resistor 326, a coupling detection comparator 324, and a trigger detection comparator 325.

A first end of the coupling resistor 326 is connected to the DT terminal 14, and a second end of the coupling resistor 326 is connected to an anode terminal of the Zener diode 322.

A first end of the battery switch 320 is connected to a positive end of the battery 60, and a second end of the battery switch 320 is connected to a positive electrode of the power source 321 and a cathode terminal of the Zener diode 322. A negative electrode of the power source 321 is connected to the non-inverting input terminal of the coupling detection comparator 324. An anode terminal of the Zener diode 322 is connected to the DT terminal 14 through the coupling resistor 326, and is also connected to the inverting input terminal of the coupling detection comparator 324.

Further, an anode terminal of the Zener diode 322 is connected to a non-inverting input terminal of the trigger detection comparator 325. A positive electrode of the power source 323 is connected to an inverting input terminal of the trigger detection comparator 325, a negative electrode of the power source 323 is connected to the ground. That is, the potential $V_{DT}$ is inputted to the inverting input terminal of the coupling detection comparator 324 and to the non-inverting input terminal of the trigger detection comparator 325.

The battery switch 320 is OFF when the battery pack 100 is in the shut-down state, and is ON when the battery pack 100 is in the non-shut-down state. The power source 321 has a voltage V20. The power source 323 has a voltage V21. The Zener diode 322 has a Zener voltage $V_{ZDH}$.

In the external device 600, the trigger switch output circuit 640 includes a Zener diode 621 and a circuit resistor 622. The Zener diode 621 has a Zener voltage $V_{ZDL}$. A cathode terminal of the Zener diode 621 is connected to the connection line 660. The circuit resistor 622 is serially connected to an anode terminal of the Zener diode 621 and is also connected to the ground. The trigger switch 650 is parallelly connected to the circuit resistor 622. Thus, when the trigger switch 650 is ON, short-circuit occurs between both terminals of the circuit resistor 622.

Figure 8:
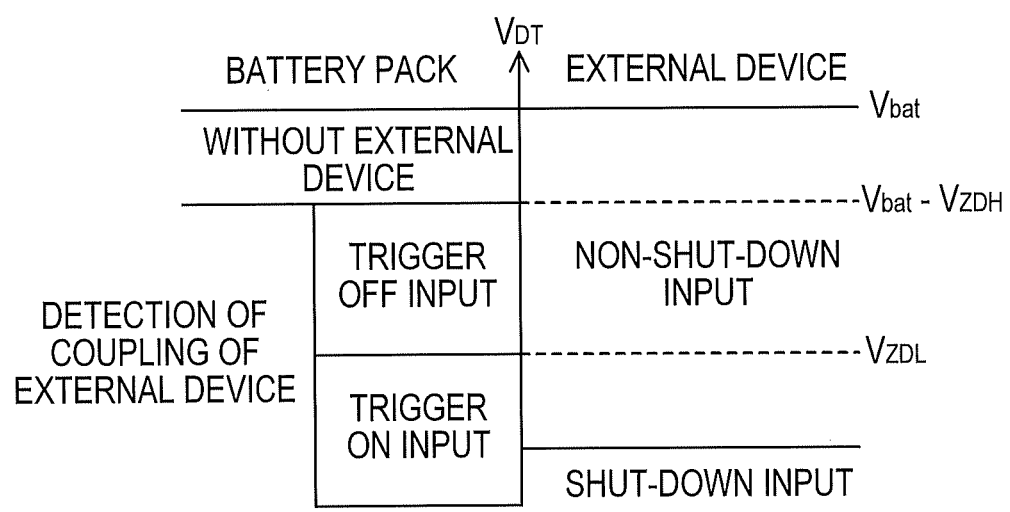
FIG. 8 is a view showing a correspondence relationship among the plurality of device signals and potentials at a communication terminal in the second embodiment.

FIG. 8 shows a correspondence relationship among the potential $V_{DT}$, and a state of the external device 600 and a state of the battery pack 100 in the second detection principle.

First, a description will be given of the potential $V_{DT}$ when the battery pack 100 is in the non-shut-down state (that is, when the battery switch 320 is ON).

If the external device 600 is in the uncoupled state, then the potential $V_{DT}$ is Vbat.

If the external device 600 is in the coupled state, and also the trigger switch 650 is OFF, then electric current flows through the battery switch 320, the Zener diode 322, the coupling resistor 326, the DT terminal 14, the device-side communication terminal 64, the Zener diode 621, and the circuit resistor 622. Thus, the potential $V_{DT}$ is Vbat–$V_{ZDH}$.

If the external device 600 is in the coupled state, and also the trigger switch 650 is ON, then electric current flows through the battery switch 320, the Zener diode 322, the coupling resistor 326, the DT terminal 14, the device-side communication terminal 64, the Zener diode 621, and the trigger switch 650. Thus, the potential $V_{DT}$ is $V_{ZDL}$.

That is, the battery 60 and the Zener diode 322 generate the potential Vbat–$V_{ZDH}$ at the DT terminal 14 based on a positive electrode potential of the battery 60 when the external device 600 is in the coupled state and also the trigger switch 650 is OFF. Also, the Zener diode 621 generates a potential $V_{ZDL}$ based on a ground potential at the DT terminal 14 when the external device 600 is in the coupled state and also the trigger switch 650 is ON. Accordingly, there is a large difference between the potential $V_{DT}$ when an OFF signal is inputted to the DT terminal 14 and the potential $V_{DT}$ when an ON signal is inputted to the DT terminal 14, thereby enabling reduction in false detection of an OFF signal and an ON signal.

In a case where the coupling resistor 326 is not provided, no electric current flows to the detection switch 614 when the trigger switch 650 is ON, and thus the detection switch 614 is not turned ON. Thus, the coupling resistor 326 is provided to protect each device and to allow electric current to flow to the detection switch 614. The circuit resistor 622 is set to a relatively great value similarly to the circuit resistor 612 in the detection principle of the first embodiment.

If the battery pack 100 is in the shut-down state and the external device 600 is coupled to the battery pack 100, then the battery switch 320 is OFF; thus, the DT terminal 14 is connected to the ground through Zener diode 621 and the circuit resistor 622, and the potential $V_{DT}$ is a ground potential. If the battery pack 100 is in the shut-down state and the external device 600 is not coupled to the battery pack 100, the potential $V_{DT}$ is an open potential.

The voltage V20 of the power source 321 is set to a value less than the Zener voltage $V_{ZDH}$ of the Zener diode 322. Also, the voltage V21 of the power source 323 is set to a value between Vbat–$V_{ZDH}$ and $V_{ZDL}$. As a result, an output from the coupling detection comparator 324 is "H" or "L" depending on whether the external device 600 is in the uncoupled state. Also, if the external device 600 is in the coupled state, an output of the trigger detection comparator 325 is "H" or "L" depending on whether the trigger switch 650 is ON or OFF. Accordingly, the MPU 620 can obtain an uncoupling signal, an OFF signal, and an ON signal based on outputs of the coupling detection comparator 324 and the trigger detection comparator 325.

In the present detection principle, the detection circuit 310 corresponds to one example of a detector of the present disclosure. The battery 60, the battery switch 320, and the Zener diode 322 each correspond to one example of a potential generator of the present disclosure, and the trigger switch 650 and the Zener diode 621 each correspond to one example of a device-side potential generator of the present disclosure. Further, the battery switch 320 corresponds to one example of a shut-down outputter of the present disclosure, and the circuit resistor 622 corresponds to one example of an electric current adjuster of the present disclosure.

<2. Configuration of Communication Circuit>

Figure 9:
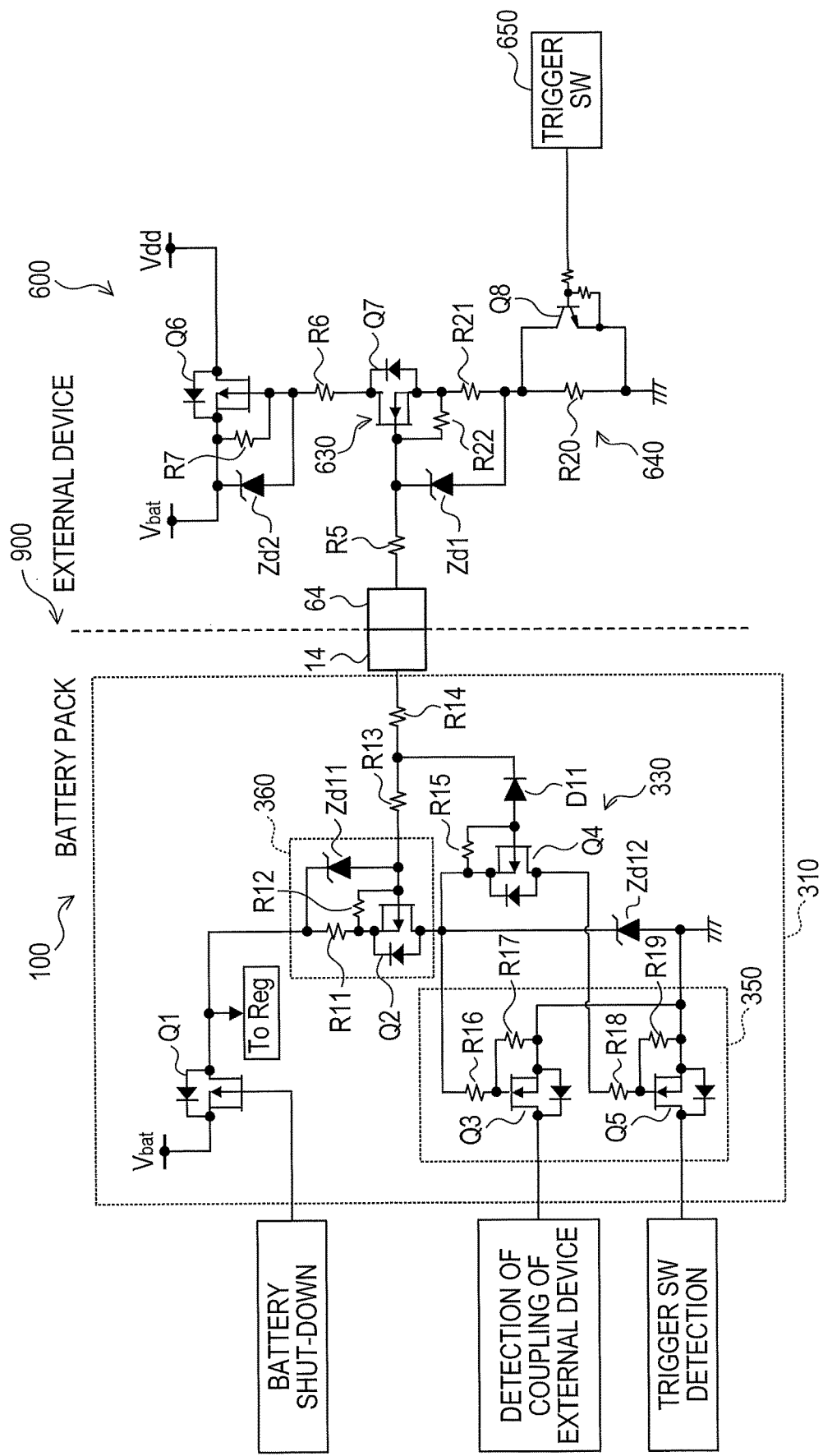
FIG. 9 is a communication circuit diagram of a battery system in the second embodiment.

Next, a description will be given of a specific configuration of a communication circuit of the battery pack 100 and the external device 600 that achieves the detection principle in the second embodiment with reference to FIG. 9.

In the battery pack 100, the detection circuit 310 includes the determiner 350, a constant current circuit 360, the switches Q1, Q4, resistors R13, R14, R15, a Zener diode Zd12, and a diode D11. The determiner 350 includes switches Q3, Q5, and resistors R16, R17, R18, R19. The constant current circuit 360 includes a switch Q2, resistors R11, R12, and a Zener diode Zd11. Each of the switches Q1, Q2, Q4 includes a P-channel MOSFET. Each of the switches Q3, Q5 includes an N-channel MOSFET.

A drain terminal of the switch Q1 is connected to the constant current circuit 360. Specifically, the drain terminal of the switch Q1 is connected to a first terminal of the resistor R11 and a cathode terminal of the Zener diode Zd11. A second terminal of the resistor R11 is connected to a first terminal of the resistor R12 and a source terminal of the switch Q2. A second terminal of the resistor R12 and an anode terminal of the Zener diode Zd11 are connected to a gate terminal of the switch Q2. A drain terminal of the switch Q2 is connected to a cathode terminal of the Zener diode Zd12. An anode terminal of the Zener diode Zd12 is connected to the ground. The Zener diode Zd11 has a Zener voltage of Vd11, and the Zener diode Zd12 has a Zener voltage of Vd12.

A first terminal of the resistor R14 is connected to the DT terminal 14, and a second terminal of the resistor R14 is connected to a first terminal of the resistor R13. A second terminal of the resistor R13 is connected to the gate terminal of the switch Q2.

A connection point of the resistor R14 and the resistor R13 is connected to a cathode terminal of the diode D11. An anode terminal of the diode D11 is connected to a gate terminal of the switch Q4 and a first terminal of the resistor R15. A source terminal of the switch Q4 and a second terminal of the resistor R15 are connected to the drain terminal of the switch Q2 and a first terminal of the resistor R16. A drain terminal of the switch Q4 is connected to a first terminal of the resistor R18.

A second terminal of the resistor R16 is connected to a gate terminal of the switch Q3 and a first terminal of the resistor R17. A source terminal of the switch Q3 is connected to a second terminal of the resistor R17 and a source terminal of the switch Q5. A drain terminal of the switch Q3 is connected to the MPU 620. In the second embodiment, an "H" signal is outputted to the MPU 620 when the switch Q3 is OFF, and an "L" signal is outputted to the MPU 620 when the switch Q3 is ON.

A second terminal of the resistor R18 is connected to a gate terminal of the switch Q5 and a first terminal of the resistor R19. A source terminal of the switch Q5 is connected to a second terminal of the resistor R19. A drain terminal of the switch Q5 is connected to the MPU 620. In the second embodiment, an "H" signal is outputted to the MPU 620 when the switch Q5 is OFF, and an "L" signal is outputted to the MPU 620 when the switch Q3 is ON.

In the external device 600, the trigger switch output circuit 640 includes the Zener diode Zd1, resistors R20, R21, R22, and the switch Q8. The battery detector 630 includes the switch Q7. Further, the external device 600 includes the switch Q6, the resistors R5, R6, R7, and the Zener diode Zd2.

The first end of the resistor R5 is connected to the device-side communication terminal 64. The second end of the resistor R5 is connected to the cathode terminal of the Zener diode Zd1, a first terminal of the resistor R22, and the gate terminal of the switch Q7. A second terminal of the resistor R22 and the source terminal of the switch Q7 are connected to a first terminal of the resistor R21. The anode terminal of the Zener diode Zd1 and a second terminal of the resistor R21 are connected to a first terminal of the resistor R20. A second terminal of the resistor R20 is connected to the ground. The Zener diode Zd1 has a Zener voltage of Vd1.

The collector terminal of the switch Q8 is connected to the first terminal of the resistor R20, and an emitter terminal of the switch Q8 is connected to the ground. A base terminal of the switch Q8 is connected to the trigger switch 650. The switch Q8 is ON when the trigger switch 650 is ON, and the switch Q8 is OFF when the trigger switch 650 is OFF.

The battery voltage Vbat and the Zener voltages Vd11, Vd12, Vd1 are set to satisfy the following: (Vbat−Vd11) >Vd12>Vd1.

Next, a description will be given of an operation of the communication circuit in the second embodiment with reference to FIGS. 9 and 10.

A description will be made first for a case where the battery pack 100 is in the non-shut-down state (that is, where the switch Q1 is ON).

If the external device 600 is in the uncoupled state, the potential $V_{DT}$ is Vbat. In this case, the switches Q2, Q4 in the battery pack 100 are OFF. Since the switch Q4 is OFF, the switches Q3, Q5 are also OFF. Also, since the switches Q3, Q5 are OFF, an output from each of the switches Q3, Q5 is "H".

If the external device 600 is in the coupled state and also the trigger switch 650 is OFF, then the switch Q8 is OFF, and thus the potential $V_{DT}$ is approximately (Vdat−Vd11). In this case, a source potential Vbat of the switch Q2 is higher than a gate potential (Vdat−Vd11), and thus the switch Q2 is ON. Since a source potential Vd12 of the switch Q4 is lower than the gate potential (Vdat−Vd11), the switch Q4 is OFF.

Since a gate potential Vd12 of the switch Q3 is higher than a source potential zero, the switch Q3 is ON. Since the switch Q4 is OFF, the switch Q5 has a gate potential not higher than a source potential, and is OFF. Accordingly, an output of the switch Q3 is "L", and an output of the switch Q5 is "H".

As the voltage Vbat of the battery 60 is greater, electric current flowing in the resistor R11 becomes greater, and thus a voltage between terminals of the resistor R11 becomes greater. Since the Zener diode Zd11 is parallelly connected to the resistor R11 and the resistor R12, which are serially connected to each other, a sum of a voltage between terminals of the resistor R11 and a voltage between terminals of the resistor R12 is a constant Zener voltage Vd11. Thus, as the voltage between the terminals of the resistor R11 is greater, an inter-terminal voltage between source and gate of the switch Q2 becomes less. That is, as the voltage Vbat of the battery 60 is greater, the inter-terminal voltage between source and gate of the switch Q2 becomes less. As the inter-terminal voltage between source and gate of the switch Q2 becomes less, electric current flowing from the drain terminal of the switch Q2 becomes less. As a result, the constant current circuit 360 supplies a constant current to the determiner 350, regardless of the value of the voltage Vbat of the battery 60.

If the external device 600 is in the coupled state and also the trigger switch 650 is ON, then the switch Q8 is ON, and thus the potential $V_{DT}$ is approximately Vd1. In this case, the source potential Vbat of the switch Q2 is higher than the gate potential Vd1, and thus the switch Q2 is ON. Since the source potential Vd12 of the switch Q4 is higher than the gate potential Vd1, the switch Q4 is ON.

Since the gate potential Vd12 of the switch Q3 is higher than the source potential zero, the switch Q3 is ON. Since the switch Q4 is ON, the switch Q5 has a gate potential higher than the source potential zero, and is ON. Thus, an output of the switch Q3 is "L", and an output of the switch Q5 is "L".

Accordingly, the MPU 620 can obtain an uncoupling signal, an OFF signal, and an ON signal in accordance with a combination of the outputs from the switches Q3 and Q5.

If the battery pack 100 is in the shut-down state and also the external device 600 is in the coupled state, then the switch Q1 is OFF, and thus the switches Q2 to Q5 are all OFF. Thus, the DT terminal 14 is connected to the ground through the resistors R5, R22, and R21, and thus the potential $V_{DT}$ is a ground potential. Accordingly, the switch Q7 and the switch Q6 are OFF. That is, the switch Q7 is ON when the battery pack 100 is in the non-shut-down state, while the switch Q7 is OFF when the battery pack 100 is in the shut-down state. On the other hand, if the battery pack 100 is in the shut-down state and also the external device 600 is in the uncoupled state, the switch Q1 is OFF, and thus the switches Q2 to Q5 are all OFF. Thus, the potential $V_{DT}$ is an open potential.

In this communication circuit, the detection circuit 310 corresponds to one example of the detector of the present disclosure, the constant current circuit 360 corresponds to one example of the constant current device of the present disclosure. Also, the switch Q1 corresponds to one example of the shut-down outputter of the present disclosure, and the resistor R20 corresponds to one example of the electric current adjuster of the present disclosure. Further, the battery 60, the switch Q1, and the Zener diode Zd11 each correspond to one example of the potential generator, and the switch Q8 and the Zener diode Zd1 each correspond to one example of the device-side potential generator of the present disclosure.

<4. Effects>

According to the second embodiment as described above, further effects below can be achieved in addition to the above-described effects (1) to (4) of the first embodiment.

(5) When an OFF signal is inputted from the external device 600 to the battery pack 100, a relatively high potential is generated at the DT terminal 14 based on the potential Vbat of the positive electrode of the battery 60. On the other hand, when an ON signal is inputted from the external device 600 to the battery pack 100, a relatively low potential is generated at the DT terminal 14 based on the ground potential. Accordingly, it is possible to achieve a great potential difference between the potential $V_{DT}$ when an OFF signal is inputted to the DT terminal 14 and potential $V_{DT}$ when an ON signal is inputted to the DT terminal 14. That is, false detection between an OFF signal and an ON signal can be reduced. This allows a simple configuration of the determiner 350.

(6) The battery pack 100 includes the constant current circuit 360. This enables a constant current consumption by the determiner 350, regardless of the voltage Vbat of the battery 60. That is, current consumption by the determiner 350 in the case of relatively high voltage Vbat will not increase as compared with the case of relatively low voltage Vbat. Accordingly, a reduced current consumption by the determiner 350 can be achieved.

Third Embodiment

Since a third embodiment has a similar basic configuration to that of the first embodiment, common configurations will not be further described and differences will be mainly described. The same reference numerals as in the first embodiment represent the same configurations, and reference will be made to the previous descriptions thereof.

In the first embodiment, three device signals, i.e., an uncoupling signal, an OFF signal, and an ON signal as well as a shut-down signal are inputted or outputted through the single DT terminal 14. The third embodiment is different from the first embodiment in that an uncoupling signal, an OFF signal, an ON signal, and a shut-down signal are inputted or outputted through respective different terminals.

<1. Detection Principle>

Next, a description will be given of a detection principle of the three device signals, and of a shut-down signal according to the third embodiment, focusing differences from the detection principle of the first embodiment, with reference to FIG. 11.

Figure 11:
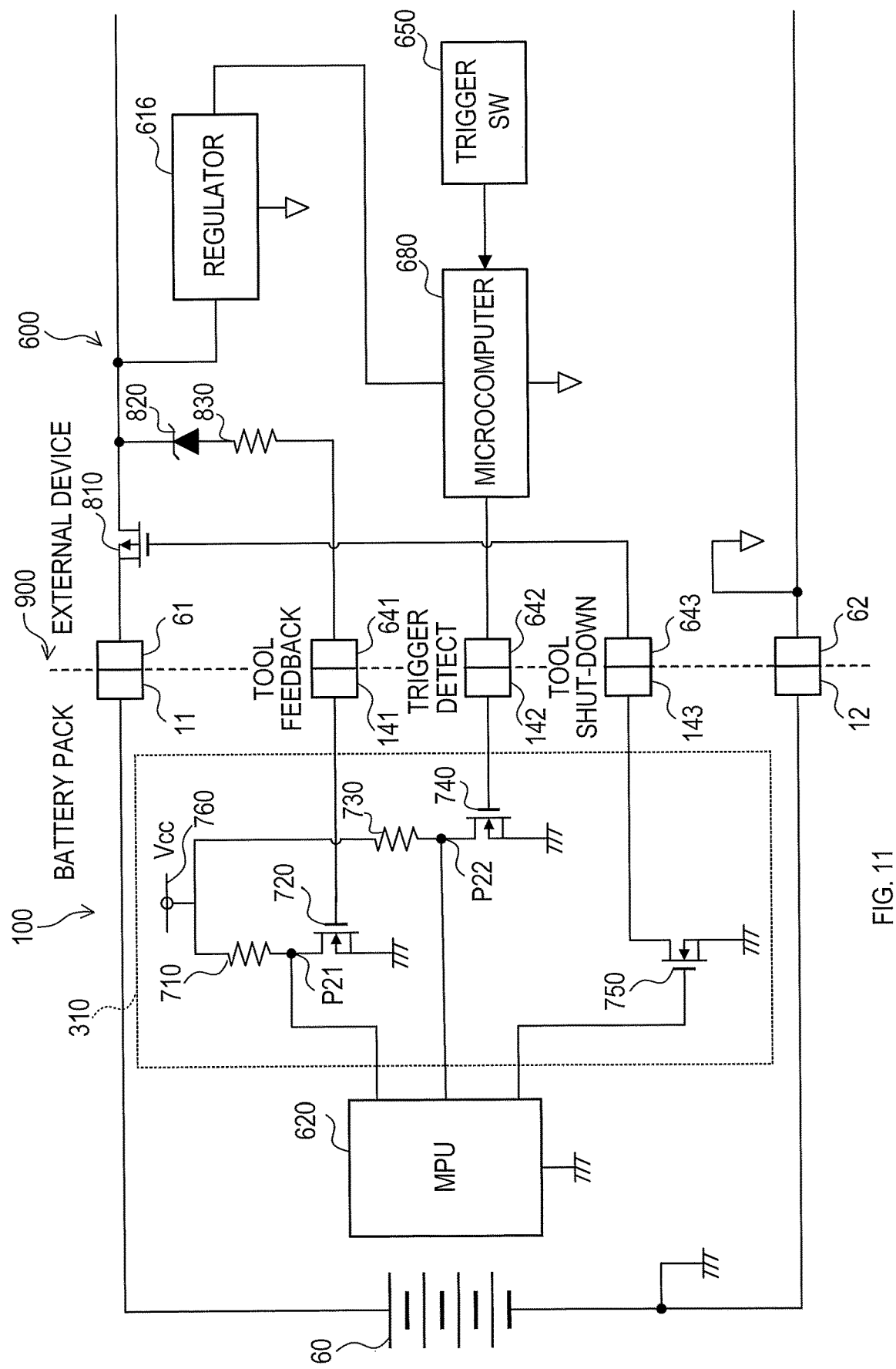
FIG. 11 is a communication circuit diagram of a battery system in a third embodiment.

As shown in FIG. 11, the battery pack 100 includes a TFB terminal 141, a TD terminal 142, and a TS terminal 143, in place of the DT terminal 14. Also, the external device 600 includes a device-side TFB terminal 641 to be connected to the TFB terminal 141, a device-side TD terminal 642 to be connected to the TD terminal 142, and a device-side TS terminal 643 to be connected to the TS terminal 143, in place of the device-side communication terminal 64.

An uncoupling signal is inputted to the battery pack 100 through the device-side TFB terminal 641 and the TFB terminal 141. An ON signal or OFF signal of the trigger switch 650 is inputted to the battery pack 100 through the device-side TD terminal 642 and the TD terminal 142. A shut-down signal is inputted to the external device 600 through the TS terminal 143 and the device-side TS terminal 643.

As shown in FIG. 11, the battery pack 100 includes the detection circuit 310. The detection circuit 310 includes a first resistor 710, a second resistor 730, a first switch 720, a second switch 740, and a breaker switch 750. Each of the first switch 720, the second switch 740, and the breaker switch 750 includes an N-channel MOSFET.

A first end of the first resistor 710 and a first end of the second resistor 730 are connected to a power source 760 having a potential Vcc. A second end of the first resistor 710 is connected to a drain terminal of the first switch 720. A connection point P21 between the first resistor 710 and the first switch 720 is connected to the MPU 620. A source terminal of the first switch 720 is connected to the ground, and a gate terminal of the first switch 720 is connected to the TFB terminal 141.

A second end of the second resistor 730 is connected to a drain terminal of the second switch 740, and a connection point P22 between the second resistor 730 and the second switch 740 is connected to the MPU 620. A source terminal of the second switch 740 is connected to the ground, and a gate terminal of the second switch 740 is connected to the TD terminal 142.

A gate terminal of the breaker switch 750 is connected to the MPU 620. A source terminal of the breaker switch 750 is connected to the ground, and a drain terminal of the breaker switch 750 is connected to the TS terminal 143.

The external device 600 includes the regulator 616, the trigger switch 650, a microcomputer 680, a power switch 810, a Zener diode 820, and a device resistor 830. The power switch 810 includes a P-channel MOSFET.

A source terminal of the power switch 810 is connected to the device-side positive terminal 61. A gate terminal of the power switch 810 is connected to the device-side TS terminal 643, and a drain terminal of the power switch 810 is connected to a cathode terminal of the Zener diode 820 and the regulator 616.

An anode terminal of the Zener diode 820 is connected to a first end of the device resistor 830. A second end of the device resistor 830 is connected to the device-side TFB terminal 641.

The microcomputer 680 is connected to the device-side TD terminal 642. The regulator 616 is connected to the microcomputer 680. An ON signal or OFF signal of the trigger switch 650 is inputted to the microcomputer 680.

The MPU 620 in a normal state (specifically, except for an over-discharge state) outputs an "H" signal to the breaker switch 750, to thereby turn ON the breaker switch 750. When the breaker switch 750 is ON, a potential of the TS terminal 143 is a ground potential.

If the external device 600 is not coupled to the battery pack 100, then an "H" signal is not inputted to the TFB terminal 141 or the TD terminal 142, the first switch 720 and the second switch 740 are OFF. As a result, a potential at the connection point P21 and the connection point P22 is Vcc. The potential Vcc at the connection point P21 and the connection point P22 is inputted to the MPU 620. Upon receiving input of Vcc as the potential at the connection point P21, the MPU 620 detects uncoupling of the external device 600.

Upon coupling of the external device 600 to the battery pack 100, an "L" signal is inputted to the gate terminal of the power switch 810 through the TS terminal 143 and the device-side TS terminal 643. This turns ON the power switch 810, and power is supplied from the battery pack 100 to the external device 600. Then, an "H" signal is inputted to the gate terminal of the first switch 720 through the Zener diode 820, the device resistor 830, the device-side TFB terminal 641, and the TFB terminal 141. As a result, the first switch 720 is turned ON, and a ground potential is inputted to the MPU 620 as a potential at the connection point P21. Upon receiving input of the ground potential as the potential at the connection point P21, the MPU 620 detects coupling of the external device 600.

Also, upon receiving input of an ON signal from the trigger switch 650, the microcomputer 680 outputs an "H" signal to the device-side TD terminal 642. The outputted "H" signal is inputted to the gate terminal of the second switch 740 through the device-side TD terminal 642 and the TD terminal 142. As a result, the second switch 740 is turned ON, and a ground potential is inputted to the MPU 620 as the potential at the connection point P22. Upon receiving input of the ground potential as the potential at the connection point P22, the MPU 620 detects an ON signal from the trigger switch 650.

On the other hand, upon receiving input of an OFF signal from the trigger switch 650, the microcomputer 680 outputs an "L" signal to the device-side TD terminal 642. The outputted "L" signal is inputted to the gate terminal of the second switch 740 through the device-side TD terminal 642 and the TD terminal 142. As a result, the second switch 740 is turned OFF, and Vcc is inputted to the MPU 620 as the potential at the connection point P22. Upon receiving input of Vcc as the potential at the connection point P22, the MPU 620 detects an OFF signal from the trigger switch 650.

If the battery 60 enters an over-discharge state, then the MPU 620 becomes shut down. Thus, input of an "H" signal to the gate terminal of the breaker switch 750 is stopped, and the breaker switch 750 is tuned OFF. Alternatively, if the battery 60 enters an over-discharge state, then the MPU 620 outputs an "L" signal to the gate terminal of the breaker switch 750, to thereby turn OFF the breaker switch 750, and subsequently becomes shut down. Once the breaker switch 750 is turned OFF, an "L" signal is not inputted to the TS terminal 143 or the device-side TS terminal 643. As a result, the power switch 810 is turned OFF, and power supply from the battery pack 100 to the external device 600 is interrupted.

<2. Mode Changing Process>

Figure 12:
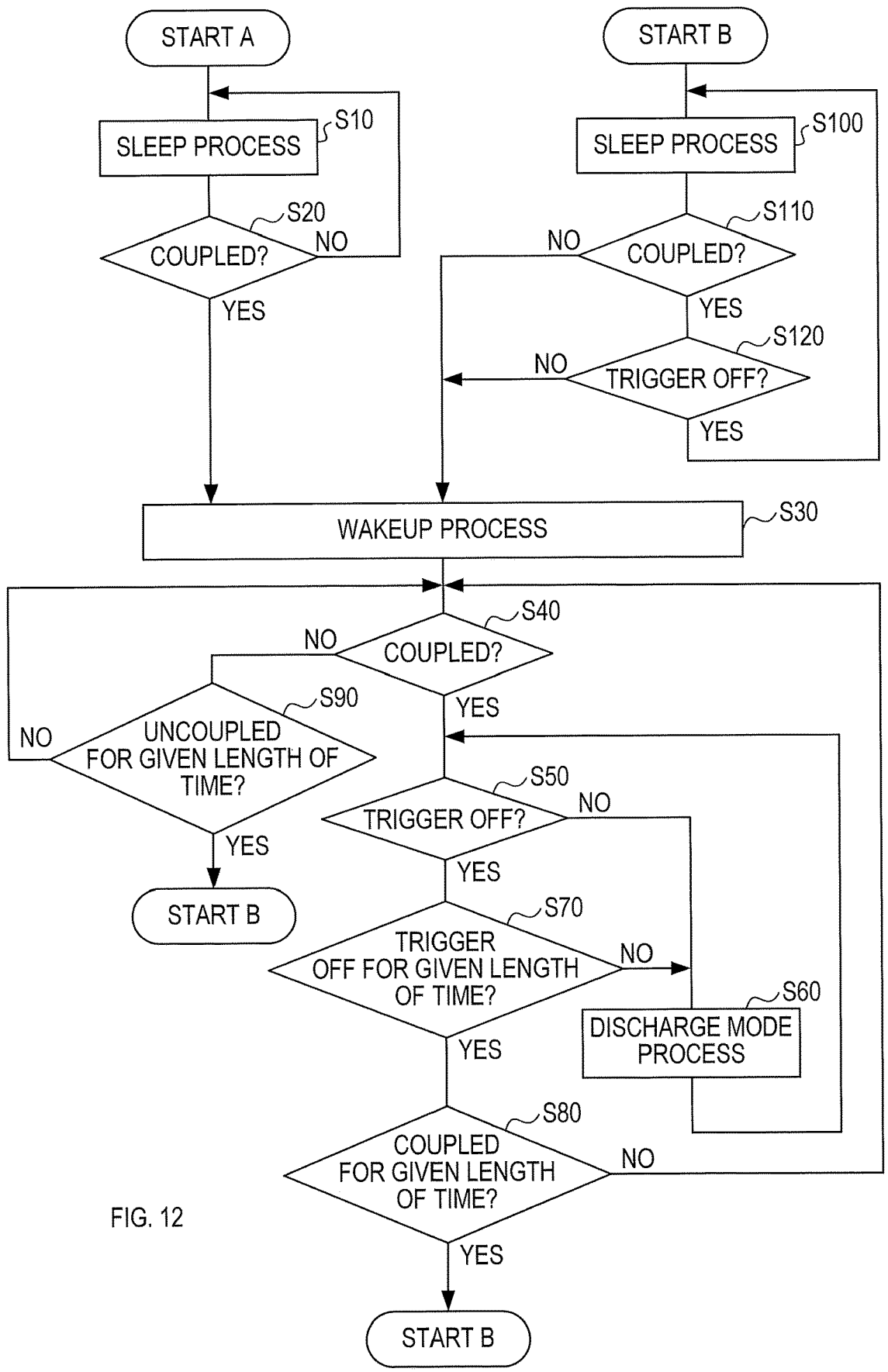
FIG. 12 is a flowchart showing a mode changing process in the first to third embodiments.

Next, a description will be given of a mode changing process of the battery pack 100 executed by the MPU 620 in the third embodiment, with reference to a flowchart of FIG. 12. Without the external device 600 coupled, the battery pack 100 executes a process from Start A, while with the external device 600 coupled, the battery pack 100 executes a process from Start B. Also, the MPU 620 of the first or the second embodiment may execute the mode changing process of the battery pack 100 as shown in FIG. 12.

When starting the process from Start A, the MPU 620 first executes a sleep process in S10. Specifically, the MPU 620 partially stops its operation to thereby reduce electric power consumption.

Subsequently, in S20, the MPU 620 determines whether the external device 600 is coupled to the battery pack 100 based on a detection result that is inputted from the detection circuit 310 and indicates an uncoupled state or a coupled state. In response to a determination in S20 that the external device 600 is not coupled, the present process returns to S10, and a sleep state is maintained. On the other hand, in response to a determination in S20 that the external device 600 is coupled, the present process proceeds to S30.

In S30, the MPU 620 executes a wakeup process to make a change from a sleep mode, in which the operation is partially stopped, to a normal operation mode. Specifically, upon coupling of the external device 600 to the battery pack 100, the MPU 620 wakes up before the trigger switch 650 of the external device 600 is turned ON. Upon wakeup of the MPU 620, various signals are inputted to the MPU 620. The MPU 620 determines whether the battery pack 100 is in a dischargeable state based on the inputted various signals, in preparation for a case where the trigger switch 650 of the external device 600 is turned ON.

In S40, the MPU 620 determines again whether the external device 600 is coupled to the battery pack 100 based on a detection result that is inputted from the detection circuit 310 and indicates the uncoupled state or the coupled state. In response to a determination in S40 that the external device 600 is coupled, the present process proceeds to S50, whereas in response to a determination that the external device 600 is not coupled, the present process proceeds to S90.

In S50, the MPU 620 determines whether the trigger switch 650 is OFF based on a detection result that is inputted from the detection circuit 310 and indicates ON or OFF of the trigger switch 650. In response to a determination in S50 that the trigger switch 650 is OFF, the present process proceed to S70. In response to a determination in S50 that the trigger switch 650 is ON, the present process proceed to S60.

In S60, the MPU 620 executes a discharge mode process in response to the determination that the trigger switch 650 is ON. Specifically, the MPU 620 outputs a discharge permission signal while the battery 60 is in the dischargeable state, and outputs a discharge prohibition signal while the battery 60 is in a non-dischargeable state. Subsequently, the present process returns to S50.

In a case where the MPU 620 wakes up before receiving an ON signal of the trigger switch 650, a state of the battery 60 can be determined before receiving an ON signal of the trigger switch 650. Thus, the MPU 620 can immediately output a discharge permission signal or a discharge prohibition signal as soon as receiving an ON signal of the trigger switch 650.

In contrast, in a case where the MPU 620 wakes up after receiving an ON signal of the trigger switch 650, the MPU 620 determines a state of the battery 60 after receiving an ON signal and then waking up. Thus, there is a time lag between the time of receiving an ON signal and the time of outputting a discharge permission signal or a discharge prohibition signal by the MPU 620.

In S70, the MPU 620 determines whether an OFF-state of the trigger switch 650 has continued for a given length of time. In response to a determination in S70 that the OFF-state of the trigger switch 650 has continued for the given length of time, the present process proceeds to S80. On the other hand, in response to a determination in S70 that the OFF-state of the trigger switch 650 has not continued for the given length of time, the present process returns to S60, and the discharge mode process is executed.

A user sometimes pulls a trigger again after releasing the trigger of the external device 600 to continue using the external device 600. Thus, it may be preferable to allow the user to immediately use the external device 600 when pulling the trigger again. Accordingly, the present process does not proceed to S80 unless the OFF-state of the trigger switch 650 has continued for the given length of time. This enables the discharge mode process to be already executed at the time of pulling the trigger again by the user.

In S80, the MPU 620 determines whether the coupled state of the external device 600 has continued for a given length of time. If the MPU 620 determines in S80 that the coupled state of the external device 600 has not continued for the given length of time, then the present process returns to S40. That is, after stopping execution of the discharge mode process, a change to the sleep mode (Start B) will not occur for the given length of time.

On the other hand, if the MPU 620 determines in S80 that the coupled state of the external device 600 has continued for the given length of time, then the present process proceeds to Start B. That is, if the OFF-state of the trigger switch 650 has continued for the given length of time and also the coupled state of the external device 600 has continued for the given length of time, then the MPU 620 determines that the battery pack 100 is stored being coupled with the external device 600, and proceeds to Start B.

If the MPU 620 determines in S40 that the external device 600 is not coupled, then the MPU 620 determines in S90 whether the uncoupled state of the external device 600 has continued for a given length of time. If the MPU 620 determines in S90 that the uncoupled state of the external device 600 has not continued for the given length of time, then the present process returns to S40. That is, after coupling with the external device 600 is released, a change to the sleep mode (Start A) will not occur for the given length of time.

The external device 600 initially coupled to the battery pack 100 and the external device 600 coupled again to the battery pack 100 may be different devices. A user may remove the battery pack 100 from a first external device 600 and couple the same to a second external device 600. In this case, the battery pack 100 wakes up from the sleep state and changes to the normal operation mode in response to coupling of the first external device 600. If the battery pack 100 is changed to the sleep mode in response to removal of the battery pack 100 from the first external device 600, then the user cannot immediately use the second external device 600 when the second external device 600 is coupled to the battery pack 100. In order to avoid such a situation, the MPU 620 maintains the normal operation mode and returns to S40 if the uncoupled state of the external device 600 has not continued for the given length of time.

On the other hand, if the MPU 620 determines in S90 that the uncoupled state of the external device 600 has continued for the given length of time, then the MPU 620 proceeds to Start A. That is, if the uncoupled state of the external device 600 has continued for the given length of time, then the MPU 620 determines that the battery pack 100 is stored being removed from the external device 600, and proceeds to Start A.

When starting the process from Start B, the MPU 620 first executes a sleep process in S100.

Subsequently, in S110, the MPU 620 determines whether the external device 600 is coupled to the battery pack 100 based on a detection result that is inputted from the detection circuit 310 and indicates the uncoupled state or the coupled state. In response to a determination in S110 that the external device 600 is not coupled, the MPU 620 proceeds to the wakeup process in S30. Since removal of the battery pack 100 from the external device 600 during sleeping means occurrence of some manual operation of the battery pack 100, the MPU 620 wakes up in preparation for the next process. On the other hand, in response to a determination in S110 that the external device 600 is coupled, the MPU 620 proceeds to S120.

In S120, the MPU 620 determines whether the trigger switch 650 is OFF based on a detection result that is inputted from the detection circuit 310 and indicates ON or OFF of the trigger switch 650. In response to a determination in S120 that the trigger switch 650 is OFF, the MPU 620 returns to the sleep process in S100, and maintains the sleep mode.

On the other hand, in response to a determination in S120 that the trigger switch 650 is ON, the MPU 620 proceeds to the wakeup process in S30, and wakes up from the sleep mode and changes to the normal operation mode. Accordingly, if the battery pack 100 is stored with the external device 600 coupled to the battery pack 100, then the battery pack 100 wakes up from the sleep mode in response to turning ON of the trigger switch 650.

According to the third embodiment as described above, upon coupling of the external device 600 to the battery pack 100, the MPU 620 wakes up from the sleep state. This allows the MPU 620 to determine whether the battery pack 100 is in the dischargeable state and prepare for discharge prior to turning ON of the trigger switch 650. Thus, the user can use the external device 600 immediately after pulling the trigger. In a case of executing the mode changing process in the first embodiment or the second embodiment, effects similar to those achieved by the first embodiment or the second embodiment can also be achieved.

OTHER EMBODIMENTS

Although some example embodiments to implement the present disclosure have been described, the present disclosure is not limited to the above-described embodiments, but may be implemented in various forms.

(a) Although the potentials $V_{DT}$ assigned to an uncoupling signal, an OFF signal, and an ON signal decrease in this order in the aforementioned embodiments, assigning potentials $V_{DT}$ to device signals to be outputted is not limited to this. For example, the potentials $V_{DT}$ assigned to an OFF signal, an uncoupling signal, and an ON signal may decrease in this order. A relatively high potential $V_{DT}$ based on the positive electrode potential Vbat of the battery pack 60 may be assigned to an OFF signal or an ON signal. Alternatively, a relatively low potential $V_{DT}$ based on the ground potential may be assigned to an uncoupling signal or an OFF signal.

(b) Although three device signals, i.e., an uncoupling signal, an OFF signal, and an ON signal are inputted from the external device 600 to the battery pack 100 through the DT terminal 14 in the aforementioned embodiments, the present disclosure is not limited to this. Four or more device signals may be inputted from the external device 600 to the battery pack 100 through the DT terminal 14.

(c) A plurality of functions performed by a single element in the aforementioned embodiments may be achieved by a plurality of elements, or a function performed by a single element may be achieved by a plurality of elements. Also, a plurality of functions performed by a plurality of elements may be achieved by a single element, or a function performed by a plurality of elements may be achieved by a single element. Moreover, at least a part of a configuration in the aforementioned embodiments may be added to, or may replace, another configuration in the aforementioned embodiments.

What is claimed is:

1. A battery pack to supply electric power to an external device, the external device including: an operation device configured to operate by receiving electric power from the battery pack; and a switch configured to instruct operation and stop of the operation device, the battery pack comprising:
    a communication terminal configured to receive a first signal indicating uncoupling of the external device, a second signal indicating ON of the switch, and a third signal indicating OFF of the switch, the first signal having a first potential, the second signal having a second potential, the third signal having a third potential, wherein the first potential, the second potential, and the third potential are different from one another;
    a device detection determiner configured to determine whether a potential at the communication terminal is the first potential;
    a trigger switch detection determiner configured to determine whether a potential at the communication terminal is the second potential or the third potential; and
    a controller configured to (i) obtain the first signal in response to the device detection determiner determining that the potential at the communication terminal is the first potential, (ii) obtain the second signal in response to the trigger switch detection determiner determining that the potential at the communication terminal is the second potential, and (iii) obtain the third signal in response to the trigger switch detection determiner determining that the potential at the communication terminal is the third potential.

2. The battery pack according to claim 1, further comprising:
    a shut-down outputter configured to generate, at the communication terminal, a fourth potential, to thereby output a fourth signal to the external device through the communication terminal, the fourth signal indicating that the battery pack is in a shut-down state, and the fourth potential being different from the first potential, the second potential, or the third potential.

3. A battery pack to supply electric power to an external device, the external device including: an operation device configured to operate by receiving electric power from the battery pack; and a switch configured to instruct operation and stop of the operation device, the battery pack comprising:
    a communication terminal configured to receive a first signal indicating uncoupling of the external device, a second signal indicating ON of the switch, and a third signal indicating OFF of the switch, the first signal having a first potential, the second signal having a second potential, the third signal having a third potential, wherein the first potential, the second potential, and the third potential are different from one another;
    a detector configured to determine a potential at the communication terminal, to thereby detect the first signal, the second signal, or the third signal in accordance with the determined potential; and
    a potential generator configured to:
        generate, at the communication terminal, the first potential based on a positive electrode potential of the battery pack in response to uncoupling of the external device;
        generate, at the communication terminal, the second potential based on a positive electrode potential of the battery pack in response to ON of the switch; or
        generate, at the communication terminal, the third potential based on a positive electrode potential of the battery pack in response to OFF of the switch.

4. A battery pack to supply electric power to an external device, the external device including: an operation device configured to operate by receiving electric power from the battery pack; and a switch configured to instruct operation and stop of the operation device, the battery pack comprising:
    a communication terminal configured to receive a first signal indicating uncoupling of the external device, a second signal indicating ON of the switch, and a third signal indicating OFF of the switch, the first signal having a first potential, the second signal having a second potential, the third signal having a third potential, wherein the first potential, the second potential, and the third potential are different from one another;
    a detector configured to determine a potential at the communication terminal, to thereby detect the first signal, the second signal, or the third signal in accordance with the determined potential; and
    a constant current device configured to maintain a constant current consumption of the detector.

5. A battery pack to supply electric power to an external device, the external device including: an operation device configured to operate by receiving electric power from the battery pack; and a switch configured to instruct operation and stop of the operation device, the battery pack comprising:
- a communication terminal configured to receive a first signal indicating uncoupling of the external device, a second signal indicating ON of the switch, and a third signal indicating OFF of the switch, the first signal having a first potential, the second signal having a second potential, the third signal having a third potential, wherein the first potential, the second potential, and the third potential are different from one another;
- a detector configured to determine a potential at the communication terminal, to thereby detect the first signal, the second signal, or the third signal in accordance with the determined potential; and
- a control circuit configured to wake up in response to a change of the determined potential from the first potential to the third potential.

6. A battery system comprising:
an external device; and
a battery pack configured to supply electric power to the external device,
wherein the external device includes:
- an operation device configured to operate by receiving electric power;
- a switch configured to instruct operation and stop of the operation device; and
- a device-side communication terminal to communicate with the battery pack, and
wherein the battery pack includes:
- a communication terminal configured to be coupled to the device-side communication terminal, the communication terminal being configured to receive a first signal indicating uncoupling of the external device, a second signal indicating ON of the switch, and a third signal indicating OFF of the switch, the first signal having a first potential, the second signal having a second potential, the third signal having a third potential, wherein the first potential, the second potential, and the third potential are different from one another;
- a device detection determiner configured to determine whether a potential at the communication terminal is the first potential;
- a trigger switch detection determiner configured to determine whether a potential at the communication terminal is the second potential or the third potential; and
- a controller configured to (i) obtain the first signal in response to the device detection determiner determining that the potential at the communication terminal is the first potential, (ii) obtain the second signal in response to the trigger switch detection determiner determining that the potential at the communication terminal is the second potential, and (iii) obtain the third signal in response to the trigger switch detection determiner determining that the potential at the communication terminal is the third potential.

7. A battery system comprising:
an external device; and
a battery pack configured to supply electric power to the external device,
wherein the external device includes:
- an operation device configured to operate by receiving electric power;
- a switch configured to instruct operation and stop of the operation device; and
- a device-side communication terminal to communicate with the battery pack,
wherein the battery pack includes:
- a communication terminal configured to be coupled to the device-side communication terminal, the communication terminal being configured to receive a first signal indicating uncoupling of the external device, a second signal indicating ON of the switch, and a third signal indicating OFF of the switch, the first signal having a first potential, the second signal having a second potential, the third signal having a third potential, wherein the first potential, the second potential, and the third potential are different from one another; and
- a detector configured to determine a potential at the communication terminal, to thereby detect the first signal, the second signal, or the third signal in accordance with the determined potential, and
wherein the external device includes an electric current adjuster configured to increase an electric current flowing in the communication terminal at input of the second signal to the communication terminal as compared with input of the third signal to the communication terminal.

8. The battery system according to claim 6,
wherein the battery pack includes a shut-down outputter configured to generate, at the communication terminal, a fourth potential, to thereby output a fourth signal to the external device through the communication terminal, the fourth signal indicating that the battery pack is in a shut-down state, and the fourth potential being different from the first potential, the second potential, or the third potential.

9. A battery system comprising:
an external device; and
a battery pack configured to supply electric power to the external device,
wherein the external device includes:
- an operation device configured to operate by receiving electric power;
- a switch configured to instruct operation and stop of the operation device; and
- a device-side communication terminal to communicate with the battery pack, and
wherein the battery pack includes:
- a communication terminal configured to be coupled to the device-side communication terminal, the communication terminal being configured to receive a first signal indicating uncoupling of the external device, a second signal indicating ON of the switch, and a third signal indicating OFF of the switch, the first signal having a first potential, the second signal having a second potential, the third signal having a third potential, wherein the first potential, the second potential, and the third potential are different from one another;
- a detector configured to determine a potential at the communication terminal, to thereby detect the first signal, the second signal, or the third signal in accordance with the determined potential; and
- a potential generator configured to:
  generate, at the communication terminal, the first potential based on a positive electrode potential of the battery pack in response to uncoupling of the external device;

generate, at the communication terminal, the second potential based on a positive electrode potential of the battery pack in response to ON of the switch; or generate, at the communication terminal, the third potential based on a positive electrode potential of the battery pack, in response to OFF of the switch.

10. A battery system comprising:
an external device; and
a battery pack configured to supply electric power to the external device,
wherein the external device includes:
 an operation device configured to operate by receiving electric power;
 a switch configured to instruct operation and stop of the operation device; and
 a device-side communication terminal to communicate with the battery pack,
wherein the battery pack includes:
 a communication terminal configured to be coupled to the device-side communication terminal, the communication terminal being configured to receive a first signal indicating uncoupling of the external device, a second signal indicating ON of the switch, and a third signal indicating OFF of the switch, the first signal having a first potential, the second signal having a second potential, the third signal having a third potential, wherein the first potential, the second potential, and the third potential are different from one another; and
 a detector configured to determine a potential at the communication terminal, to thereby detect the first signal, the second signal, or the third signal in accordance with the determined potential, and
wherein the external device includes a device-side potential generator configured to:
 generate, at the communication terminal, the first potential based on a ground potential in response to uncoupling of the external device;
 generate, at the communication terminal, the second potential based on a ground potential in response to ON of the switch; or
 generate, at the communication terminal, the third potential based on a ground potential in response to OFF of the switch.

11. A battery system comprising:
an external device; and
a battery pack configured to supply electric power to the external device,
wherein the external device includes:
 an operation device configured to operate by receiving electric power;
 a switch configured to instruct operation and stop of the operation device; and
 a device-side communication terminal to communicate with the battery pack, and
wherein the battery pack includes:
 a communication terminal configured to be coupled to the device-side communication terminal, the communication terminal being configured to receive a first signal indicating uncoupling of the external device, a second signal indicating ON of the switch, and a third signal indicating OFF of the switch, the first signal having a first potential, the second signal having a second potential, the third signal having a third potential, wherein the first potential, the second potential, and the third potential are different from one another;
 a detector configured to determine a potential at the communication terminal, to thereby detect the first signal, the second signal, or the third signal in accordance with the determined potential; and
 a constant current device configured to maintain a constant current consumption of the detector.

12. A battery system comprising:
an external device; and
a battery pack configured to supply electric power to the external device,
wherein the external device includes:
 an operation device configured to operate by receiving electric power;
 a switch configured to instruct operation and stop of the operation device; and
 a device-side communication terminal to communicate with the battery pack, and
wherein the battery pack includes:
 a communication terminal configured to be coupled to the device-side communication terminal, the communication terminal being configured to receive a first signal indicating uncoupling of the external device, a second signal indicating ON of the switch, and a third signal indicating OFF of the switch, the first signal having a first potential, the second signal having a second potential, the third signal having a third potential, wherein the first potential, the second potential, and the third potential are different from one another;
 a detector configured to determine a potential at the communication terminal, to thereby detect the first signal, the second signal, or the third signal in accordance with the determined potential; and
 a control circuit configured to wake up in response to a change of the determined potential from the first potential to the third potential.

* * * * *